(12) United States Patent
Jillani et al.

(10) Patent No.: US 12,458,932 B2
(45) Date of Patent: Nov. 4, 2025

(54) FILTRATION MEMBRANE

(71) Applicant: KING FAHD UNIVERSITY OF PETROLEUM AND MINERALS, Dhahran (SA)

(72) Inventors: Shehzada Muhammad Sajid Jillani, Dhahran (SA); Umair Baig, Dhahran (SA); Abdul Waheed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 419 days.

(21) Appl. No.: 18/315,663

(22) Filed: May 11, 2023

(65) Prior Publication Data
US 2024/0375063 A1 Nov. 14, 2024

(51) Int. Cl.
*B01D 53/22* (2006.01)
*B01D 69/12* (2006.01)
(Continued)

(52) U.S. Cl.
CPC ....... *B01D 71/702* (2022.08); *B01D 69/1214* (2022.08); *B01D 69/1216* (2022.08);
(Continued)

(58) Field of Classification Search
CPC .............. B01D 71/702; B01D 69/1216; B01D 69/1251; B01D 69/1214; B01D 71/481;
(Continued)

(56) References Cited

U.S. PATENT DOCUMENTS

| 4,722,795 A | * | 2/1988 | Gohl | ...................... B01D 71/56 210/500.33 |
| 11,260,352 B2 | | 3/2022 | Hammami et al. | |

(Continued)

FOREIGN PATENT DOCUMENTS

| CN | 1631534 A | 6/2005 |
| CN | 103987661 B | 2/2017 |

(Continued)

OTHER PUBLICATIONS

Mazario et al. "Highly dispersed copper oxide on silica," Applied Catalysis A: General, vol. 652, Feb. 25, 2023, 119029, 12 pages (Year: 2023).*

(Continued)

*Primary Examiner* — Anthony R Shumate
(74) *Attorney, Agent, or Firm* — Oblon, McClelland, Maier & Neustadt, L.L.P.

(57) ABSTRACT

A filtration membrane including a first layer having a triamine-functionalized copper oxide polysilicate mesoporous material, a second layer including a polysulfone, and a third layer including a polyester terephthalate. The triamine-functionalized copper oxide polysilicate mesoporous material includes a copper oxide polysilicate backbone and a silicon atom of a silicon-containing triamine bonded to a silicate group in the copper oxide polysilicate backbone. The copper oxide polysilicate backbone is datively bonded to one or more tetramines, and the silicon-containing triamine and one or more tetramines are covalently cross-linked with terephthaloyl chloride to form a polyamide.

20 Claims, 28 Drawing Sheets

(51) Int. Cl.
 *B01D 71/48* (2006.01)
 *B01D 71/70* (2006.01)

(52) U.S. Cl.
 CPC ....... *B01D 69/1251* (2022.08); *B01D 71/481* (2022.08); *B01D 2257/204* (2013.01); *B01D 2257/302* (2013.01); *B01D 2257/70* (2013.01)

(58) Field of Classification Search
 CPC ........ B01D 2257/204; B01D 2257/302; B01D 2257/70
 See application file for complete search history.

(56) References Cited

U.S. PATENT DOCUMENTS

| | | | | |
|---|---|---|---|---|
| 2004/0091692 | A1* | 5/2004 | Parrinello | C08G 18/0819 428/327 |
| 2004/0105940 | A1* | 6/2004 | Parrinello | C08G 18/0814 524/500 |
| 2004/0105971 | A1* | 6/2004 | Parrinello | B41M 5/52 428/319.3 |
| 2006/0292318 | A1* | 12/2006 | Parrinello | B41M 5/52 428/32.34 |
| 2012/0245272 | A1* | 9/2012 | Dent | C08G 77/50 524/502 |
| 2014/0291241 | A1* | 10/2014 | Votaw, Jr. | B01D 67/0079 210/639 |
| 2014/0367326 | A1* | 12/2014 | Deng | B01D 69/148 210/500.26 |
| 2020/0282363 | A1* | 9/2020 | Harrigan | B01D 67/0011 |

FOREIGN PATENT DOCUMENTS

| | | | | |
|---|---|---|---|---|
| CN | 108531040 A | * | 9/2018 | ............... C09D 7/65 |
| CN | 212451068 U | | 2/2021 | |
| CN | 108348866 B | | 5/2021 | |
| WO | WO-2011056832 A1 | * | 5/2011 | .............. C08L 83/14 |

OTHER PUBLICATIONS

Machine translation CN 108531040 A (Year: 2018).*
Jillani et al. ; NH—CuO-MCM-41 covalently cross-linked multipurposemembrane for applications in water treatment: Removal ofhazardous pollutants from water, water desalination andantibiofouling performance ; Chemosphere, vol. 307, Part 1 ; Nov. 2022 ; 6 Pages.
Parida et al. ; Synthesis, characterization and catalytic activity of copper incorporatedand immobilized mesoporous MCM-41 in the single step amination ofbenzene ; Journal of Molecular Catalysis A: Chemical vol. 318, Issues 1-2 ; Mar. 1, 2010 ; 2 Pages ; Abstract Only.
Si et al. ; A high-permeance organic solvent nanofiltration membrane viacovalently bonding mesoporous MCM-41 with polyimide ; Separation and Purification Technology vol. 241 ; Jun. 15, 2020 ; 2 Pages ; Abstract Only.

\* cited by examiner

Complexation between NH$_2$-CuO-MCM-41 and tetra-amine

FILTRATION MEMBRANE

STATEMENT OF ACKNOWLEDGEMENT

The inventors acknowledge the support provided by the Interdisciplinary Research Center for Membranes and Water Security, King Fahd University of Petroleum and Minerals, Saudi Arabia, through Project INMW2205.

STATEMENT REGARDING PRIOR DISCLOSURE BY THE INVENTORS

Aspects of the present disclosure were described in an article titled "$NH_2$—CuO-MCM-41 covalently cross-linked multipurpose membrane for applications in water treatment: Removal of hazardous pollutants from water, water desalination, and anti-biofouling performance" published in Volume 307, Part-1 of Elsevier, Chemosphere on Jul. 5, 2022, which is incorporated herein by reference in its entirety.

BACKGROUND

Technical Field

The present disclosure relates to membranes, and more particularly, relates to filtration membranes for the removal of hazardous pollutants from water.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Providing potable water to all living beings is highly desirable for the continuity of life on planet earth. Unfortunately, discharge of innumerable quantities of effluents from industrial zones and domestic consumption has increased water pollution. The pollutants are discharged from several industries, such as textile, paint, petroleum, and pharmaceutical companies. Common pollutants from such industries include hazardous dyes, toxic metal ions from tanneries, pharmaceutics, and drugs from hospital waste. Such contaminants can find seawater as their final destination and hence cause seawater pollution.

Saline wastewater is generally produced in huge quantities while manufacturing pesticides, herbicides, pharmaceuticals, and oil and gas recovery. Among the various contaminants of saline wastewater, xenobiotics are the most concerning organic pollutants, which include a majority of phenols, biphenyl compounds, and phthalates and can disrupt several endocrine functions in the human body. In addition to their side effects on human health, such compounds are relatively stable and soluble in water. In addition, various organic and inorganic constituents of pharmaceutical compounds are known to cause an increase in the chemical oxygen demand (COD) of wastewater.

In addition to salinity, pharmaceutical wastewater is highly toxic, and its composition varies with the nature of raw materials, type, and variety of medicine manufactured. Conventional methods such as bioremediation, photocatalytic degradation, and advanced oxidation have been used for treating pharmaceutical wastewater. The use of an anaerobic membrane bioreactor (AnMBR) is known for treating pharmaceuticals containing feed, where it was found that AnMBR was 60% efficient in removing total chemical oxygen demand (TCOD). Membrane-based separations are highly advantageous compared to conventional separation methods due to minimal energy requirement, ease of operation, tuneability, and cost-effectiveness.

Seawater is emerging as a sole alternative to potable water because conventional potable water resources are depleting at an alarming pace. Seawater has a high content of dissolved salts such as $MgCl_2$, $CaCO_3$, and NaCl. The presence of salts in high content makes seawater unfit for domestic and industrial consumption. Hence, treating seawater to recover precious potable water is an utmost desire.

Various ultrafiltration (UF) membranes have been developed in the literature for treating wastewater. However, the wider pore structure of the UF membrane can only inhibit bigger size molecules. Therefore, developing new thin film composite (TFC) membranes is desperately needed as TFC membranes can provide much better control of pore size and structure. Given the modular nature of TFC membranes, a huge potential lies in this area to develop multipurpose membranes that may perform multiple tasks at a given time. Although TFC membranes have been found highly efficient, biofouling of TFC membranes has been a huge challenge in the area of membrane development, which hampers the performance of the membranes. A variety of bacterial strains is present in feeds which can grow on the membrane surface and eventually lead to the formation of colonies on the surface of the membrane.

The bacterial masses/colonies can block membrane pores, resulting in a lowering of permeate flux and decreased life span of the membrane. Moreover, biofouling can also lead to bad-quality permeate, which might be attributed to the presence of several wastes excreted by bacterial colonies. Hence, controlling the biofouling of membranes lies at the heart of membrane-based desalination. Generally, chlorination is carried out using hypochlorite to prevent the growth of bacterial colonies on the membrane surface. Although chlorination is highly effective in controlling and killing bacterial strains, chlorine treatment is deleterious to membrane integrity. Therefore, the need to develop novel membranes with built-in antifouling properties to enhance both the performance and life span of membranes. Such a strategy of controlling biofouling of membrane also removes the need for an additional chlorination step, which proves to be highly advantageous in terms of cost-effectiveness.

Many antibacterial materials have been added to an active layer of membranes to control biofouling. Antibacterial additives have shown promising performance by killing bacterial strains. However, such additives suffer from several challenges, such as agglomeration of the additives and leaching of the additives during filtration experiments. For example, the leaching of copper oxide (CuO) nanoparticles from polyethersulfone (PES) material membranes was studied. After 840 hours of exposure of membranes to the cleaning solution, it was found that the membranes resulted in considerable leaching of CuO. Such leaching of CuO nanoparticles affected several membrane features such as hydrophobicity, surface roughness, pure water permeability, and salt rejection (See: Kajau et al., 2021, "Leaching of CuO Nanoparticles from PES Ultrafiltration Membranes". ACS Omega 6, 31797-31809).

Similarly, in another study, $SiO_2$ was incorporated in a nanofiltration membrane, and the leaching of $SiO_2$ by Si quantification was studied. A low level of leaching of $SiO_2$ from the membrane was detected (See: Costa Puerari et al., 2020, "The influence of amine-functionalized $SiO_2$ nanostructures upon nanofiltration membranes". Environ. Nanotechnology, Monit. Manag. 13). Generally, such additives are added physically into an active layer without any covalent bond between active layer and additive, which results in leaching.

Accordingly, an objective of the present disclosure is to provide an improved membrane that includes, for example, a covalently crosslinked antimicrobial agent in an active layer. The active layer may retain the antimicrobial agent, thereby leading to a persistent anti-biofouling performance of the membrane.

SUMMARY

In an exemplary embodiment of the present disclosure, a filtration membrane is disclosed. The filtration membrane includes a first layer having a triamine-functionalized copper oxide polysilicate mesoporous material, a second layer including a polysulfone, and a third layer including a polyester terephthalate. The triamine-functionalized copper oxide polysilicate mesoporous material includes a copper oxide polysilicate backbone and a silicon atom of a silicon-containing triamine bonded to a silicate group in the copper oxide polysilicate backbone. The copper oxide polysilicate backbone is datively bonded to one or more tetramines, and the silicon-containing triamine and the one or more tetramines are covalently cross-linked with terephthaloyl chloride to form a polyamide.

In some embodiments, the silicon atom of the silicon-containing triamine is covalently bonded to a silicate group of the copper oxide polysilicate backbone. In some embodiments, an amino terminus of the tetramine is coordinated to one or more copper atoms in the copper oxide polysilicate backbone.

In some embodiments, the silicon-containing triamine and the one or more tetramines are covalently cross-linked with terephthaloyl chloride through: (a) at least one of a primary amine of the silicon-containing triamine and a secondary amine of the silicon-containing triamine, and (b) at least one of a primary amine of the tetramine and a secondary amine of the tetramine.

In some embodiments, the one or more of the tetramines are covalently cross-linked with the terephthaloyl chloride through one or more primary amine of the tetramine and one or more secondary amine of the tetramine.

In some embodiments, the silicon-containing triamine is $N^1$-(3-trimethoxysilylpropyl) diethylenetriamine.

In some embodiments, the tetramine is N,N'-bis(3-aminopropyl) ethylenediamine.

In some embodiments, the filtration membrane comprises the triamine-functionalized copper oxide polysilicate mesoporous material in the amount of 0.01% by weight to 0.2% by weight.

In some embodiments, the copper oxide polysilicate mesoporous material has a hierarchical structure of MCM-41.

In some embodiments, the silicon-containing triamine and the one or more tetramines are covalently cross-linked with the terephthaloyl chloride with interfacial polymerization. In some embodiments, the polysulfone and polyester terephthalate are prepared by phase inversion.

In some embodiments, carbon, nitrogen, oxygen, copper, and silicon are uniformly distributed in the first layer.

In some embodiments, the filtration membrane has an average surface roughness from 7 nm to 17 nm.

In some embodiments, the filtration membrane has a water contact angle from 60° to 80°.

In some embodiments, the filtration membrane has a rate of flux from 15 L m$^{-2}$ h$^{-1}$ to 85 L m$^{-2}$ h$^{-1}$ at a pressure of 25 bar.

In another exemplary embodiment of the present disclosure, a nanofiltration method is disclosed. The nanofiltration method includes contacting an aqueous composition with the filtration membrane, where the aqueous composition includes at least water, one or more salts, and one or more pharmaceuticals. The nanofiltration method includes collecting a permeate passing through the filtration membrane to obtain a purified composition have a reduced amount of the salts and pharmaceuticals.

In some embodiments, the filtration membrane used in the nanofiltration method has a rejection profile of salts from 55% by weight to 99% by weight.

In some embodiments, the salts are $MgCl_2$, $MgSO_4$, $CaCl_2$), $Na_2SO_4$, and NaCl.

In some embodiments, the filtration membrane used in the nanofiltration method has a rejection profile of pharmaceuticals from 60% by weight to 80% by weight. In some embodiments, the pharmaceuticals are caffeine, sulfamethoxazole, amitriptyline, and loperamide.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1A:
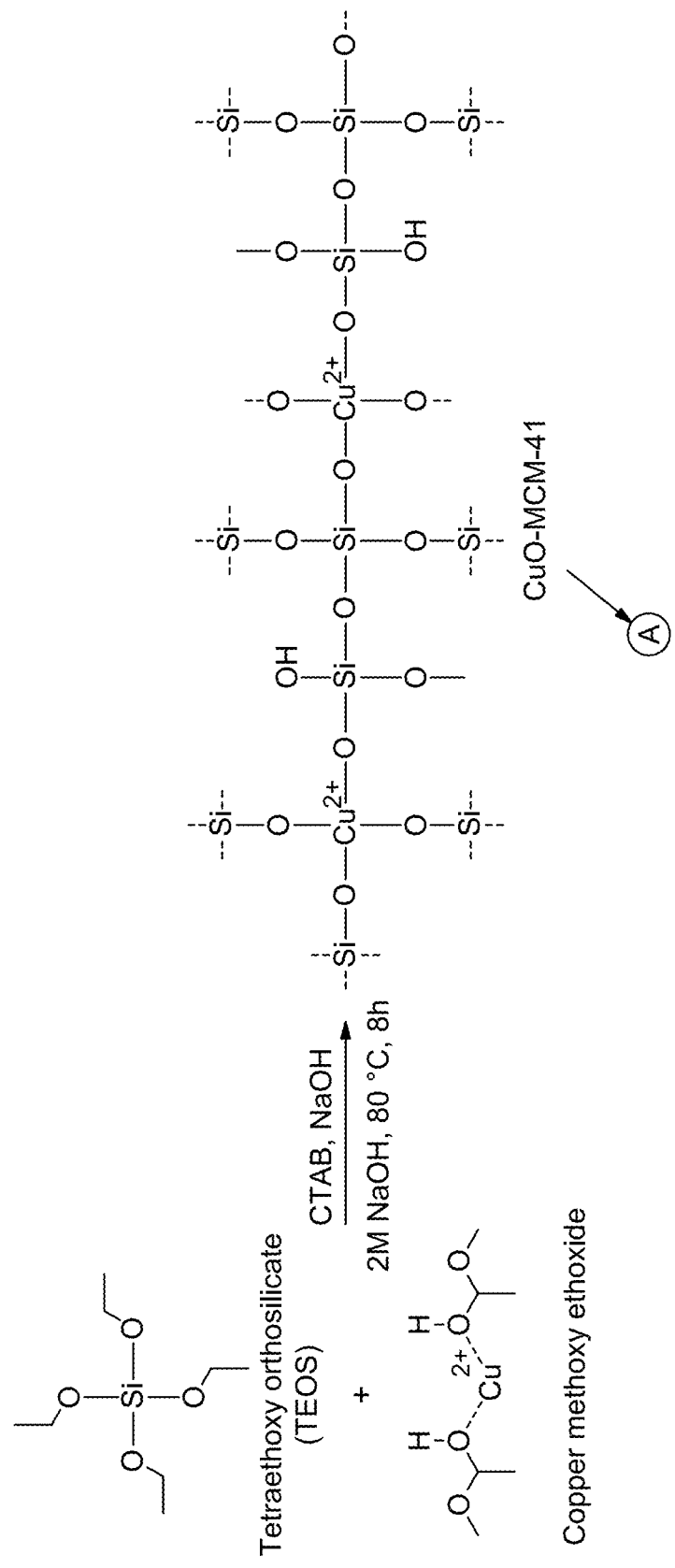
FIG. 1A is a schematic illustration depicting a synthetic route for the preparation of CuO-MCM-41 using TEOS and copper methoxy ethoxide, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Furthermore, the terms "approximately," "approximate," "about," and similar terms generally refer to ranges that include the identified value within a margin of 20%, 10%, or preferably 5%, and any values therebetween.

Aspects of the present disclosure relate to fabricating a filtration membrane (also called membrane) to target multiple application areas, such as desalting and removing micropollutants. The filtration membrane may be applied for oil-water separation, desalination, waste water treatment, and the like. In one example, in-situ incorporated copper oxide polysilicate mesoporous material (CuO-MCM-41) was synthesized, and amine (—$NH_2$) functionalized by reacting CuO-MCM-41 with $N^1$-(3-trimethoxysilylpropyl) diethylenetriamine (NTSDETA) yielding $NH_2$—CuO-MCM-41. Different concentrations of $NH_2$—CuO-MCM-41 (0%, 0.05%, and 0.1% of $NH_2$—CuO-MCM-41) were covalently cross-linked in an active polyamide layer during interfacial polymerization (IP) between N, N'-bis(3-aminopropyl) ethylenediamine and terephthaloyl chloride (TPC) on polysulfone/polyester terephthalate PS/PET support. The filtration membranes were extensively characterized by Water Contact Angle (WCA), Scanning Electron Microscopy (SEM), Fourier Transform Infra-red (FTIR) spectroscopy, Energy Dispersive X-ray (EDX) analysis, elemental mapping, and Powder X-ray Diffraction (PXRD). The membranes were further evaluated for their potential to reject a variety of salts and micropollutants.

The results indicate that the 0.05%-CuO-MCM-41/PA@PS/PET membrane showed the best performance in rejecting various salts and micropollutants. For example, the 0.05%-CuO-MCM-41/PA@PS/PET showed >98% rejection of $MgCl_2$ and 78% rejection of caffeine with a permeate flux of 16 LMH at 25 bar. Compared to conventional methods of mere physical attachment of CuO nanoparticles in the active layer, the utilization of $NH_2$—CuO-MCM-41 in thin-film composite (TFC) membrane fabrication (where copper oxide was covalently cross-linked to the active polyamide layer of the membrane) overcomes the challenges faced with the mixing additives in the active layer of membranes.

According to an aspect of the present disclosure, a membrane is described. The membrane is fabricated by incorporating an active layer (first layer) on support. The support may be porous in nature, allowing, in some aspects, liquid to permeate. In some embodiments, the active layer covers at least 50%, preferably 60%, more preferably 80%, and yet more preferably more than 95% of the surface of the support. The first layer includes a triamine-functionalized copper oxide polysilicate mesoporous material. In some embodiments, the first layer may include other mesoporous materials, such as mesoporous silica, including ZSM-5, ZSM-11, MCM-48, MCM-41, MCM-22, SUZ-4, and SBA-15 with a wide range of pore geometries (for example, hexagonal, cubic, spheric, cylindrical, rhombic, tetragonal, trigonal, amorphous, and the like) and particle morphologies, such as discs, spheres, rods, cubes, sheets, films, amorphous, and the like. Mesoporous materials contain mesopores that have a pore size having a diameter from about 2 nm to about 50 nm. Mesoporous materials may comprise carbon, activated, silica, alumina, and a combination thereof. Mesoporous material, such as mesoporous oxides, may comprise niobium, tantalum, titanium, zirconium, cerium, tin, the like, and a combination thereof.

The triamine-functionalized copper oxide polysilicate mesoporous material includes a copper oxide polysilicate backbone. The copper oxide polysilicate backbone includes copper oxide (CuO) and a polysilicate structure. The polysilicate structure includes repeating units of silicates. Silicates are compounds of a group of polyatomic anions consisting of silicon and oxygen. Examples of silicates include, but are not limited to, orthosilicate, metasilicate, and pyrosilicate. In an embodiment of the present disclosure, the polysilicate is in tetrahedral $SiO_4^{4-}$ units. The copper oxide may be bonded directly with silicate groups to form the copper oxide polysilicate backbone. The molar ratio of copper and silicon in the copper oxide polysilicate backbone may be from 1:3 to 1:20, preferably 1:3 to 1:15, and more preferably from 1:3 to 1:10. The oxidation state of copper in the polysilicate structure may be +1, +2, or a combination of both.

The copper oxide polysilicate backbone has a hierarchical structure of Mobil Composition of Matter No. 41 (MCM-41). MCM-41 has a regular cylindrical mesopore arrangement forming a one-dimensional pore system. It is characterized by an independently adjustable pore diameter, a sharp pore distribution, a large surface, and a large pore volume. The pores of MCM-41 are larger than zeolites, and the pore distribution can easily be adjusted. The mesopores have a diameter of 2 nm to 6.5 nm.

The copper oxide polysilicate backbone, or the copper oxide modified MCM-41 (herein referred to as CuO-MCM-41), is preferably synthesized by a base-catalyzed reaction between copper methoxy ethoxide and a silica source in the presence of a surfactant. Examples of silica sources include fused silica, colloidal silica, tetraalkyl silcates, tetraethyl orthosilicate (TEOS), tetramethyl orthosilicate (TMOS), other tetraalkoxysilanes, and the like. In some embodiments, the silica source is an alkoxysilane compound. As used herein, the term 'alkoxysilane compound' refers to the silane compound, which includes alkoxy radicals. The alkoxysilane compound is at least one selected from the group consisting of trimethoxy (octadecyl) silane, octadecyltrichlorosilane, and octylidimethylchlorosilane. In some embodiments, the alkoxysilane compound may include $Si(OMe)_4$, $MeSi(OMe)_3$, $MeSi(OCH_2CH_2OMe)_3$, $ViSi(OMe)_3$, $PhSi(OMe)_3$, $PhSi(OCH_2CH_2OMe)_3$, and the like. In a preferred embodiment, TEOS was used as the silica source. In an embodiment, the surfactant is cetyltrimethylammonium bromide (CTAB), hexadecylamine (HDA), sodium dodecyl sulfate (SDS), and the like. In a preferred embodiment, the surfactant is CTAB. The base may be NaOH, KOH, LiOH, RbOH, CsOH, Mg $(OH)_2$, $Ca(OH)_2$, $Sr(OH)_2$, $Ba(OH)_2$, or combinations thereof. In a preferred embodiment, the base is NaOH. The reaction is carried out at a temperature range of 50-100° C., preferably 60-90° C., more preferably at 80° C., for a period of 5-10 hours, preferably 6-8 hours, more preferably for 8 hours, under stirring, causing the incorporation of $Cu^{2+}$ with the mesoporous silica, to yield CuO-MCM-41. CuO-MCM-41 may be in a layer. The layer of CuO-MCM-41 may have a thickness of 50 to 1000 nm, preferably 50 to 500 nm, and more preferably 50 to 200 nm. In an embodiment, the synthesis of CuO-MCM-41 has a molar ratio of TEOS to copper oxide from 1:1 to 1:10, preferably 1:1 to 1:5, more preferably 1:1 to 1:3, and yet more preferably 1:1 to 1:2. The distribution of CuO in the CuO-MCM-41 is variable and dependent on the choice of the method, reaction conditions, and the concentration of the silica source. In an embodiment, the molar ratio of copper oxide and silicate groups in the copper oxide polysilicate backbone may be from 1:1 to 1:20, preferably 1:3 to 1:15, and more preferably from 1:3 to 1:10. The distribution of CuO in the CuO-MCM-41 may be at least one CuO unit every one or more silicate group. In an embodiment, one CuO unit may be repeated after at least two sequential silicate groups of the copper oxide polysilicate backbone. In some embodiments, one CuO unit may be repeated after at least three sequential silicate groups of the copper oxide polysilicate backbone. In some embodiments, silicate groups may be a single silicate group followed by a single CuO unit, in which a superset of the silicate groups followed by the CuO unit may repeat. In some embodiments, silicate groups may be at least one repeating unit and up to ten sequentially repeating units followed by a single CuO unit, in which a superset of the silicate groups followed by the CuO unit may repeat.

The triamine-functionalized copper oxide polysilicate mesoporous material (herein referred to as $NH_2$—CuO-MCM-41) further includes one or more silicon-containing triamine. Examples of silicon-containing triamines include $N^1$-(3-trimethoxysilylpropyl) diethylenetriamine, 2-N-silyl-1,3,5-triazine-2,4,6-triamine, 2-N'-silyl-5-trimethoxysilyl-pentane-1,2,2-triamine. In a preferred embodiment, the silicon-containing triamine is $N^1$-(3-trimethoxysilylpropyl) diethylenetriamine. The silicon atom of the silicon-containing triamine is bonded to one or more silicate groups in the copper oxide polysilicate backbone to form the triamine-functionalized copper oxide polysilicate mesoporous material. The nature of the interaction between the silicon atom of the silicon-containing triamine to the silicate group in the copper oxide polysilicate backbone is a covalent bond, e.g., a (triamine) Si—O—Si (silicate) bond. In an embodiment, the synthesis of the triamine-functionalized copper oxide polysilicate mesoporous material has a ratio of the copper oxide polysilcate backbone to $N^1$-(3-trimethoxysilylpropyl) diethylenetriamine of 1:1 to 1:10, preferably 1:1 to 1:5, more preferably 1:1 to 1:3, and yet more preferably about 1:2 by weight. In an embodiment, the molar ratio of the copper oxide of the copper oxide polysilicate backbone to the silicon-containing triamine is from 5:1 to 1:5, preferably 3:1 to 1:3, and more preferably about 1:1. In an embodiment, the molar ratio of the silicate groups of the copper oxide polysilicate backbone to the silicon-containing triamine is from 1:1 to 20:1, preferably 2:1 to 15:1, more preferably 3:1 to 10:1, and yet more preferably 4:1 to 7:1 The triamine-functionalized copper oxide polysilicate mesoporous material may have a thickness greater than CuO-MCM-41. The triamine-functionalized copper oxide polysilicate mesoporous material may have a thickness of 50 to 2000 nm, preferably 50 to 1000 nm, and more preferably 50 to 500 nm. The membrane has triamine-functionalized copper oxide polysilicate mesoporous material in the amount of 0.01% by weight to 0.2% by weight.

The first layer further includes a diacyl compound and a tetramine compound. A diacyl chloride compound may be a precursor for the diacyl compound in the first layer. The diacyl chloride compound may comprise a linear or branched aliphatic diacyl chloride with 0-50 carbon atoms, preferably 1-20 carbon atoms, and more preferably 3-10 carbon atoms between the two acyl chloride groups in the diacyl chloride compound. The diacyl chloride compound may comprise one or more aromatic ring, substituted or unsubstituted, with two acyl chloride groups. In a preferred embodiment, the diacyl chloride compound is an aromatic ring substituted with two acyl chloride groups. In some embodiments, the diacyl chloride compound is terephthaloyl chloride (TPC). In some embodiments, the tetramine compound is a linear or branched aliphatic amine with 2-50 carbon atoms, preferably 2-20 carbon atoms, and more preferably 5-10 carbon atoms and four amine groups. In a preferred embodiment, the tetramine is N,N'-bis(3-aminopropyl) ethylenediamine or N,N-bis(2-aminoethyl)-1,3-propanediamine. In a preferred embodiment, the tetramine is N,N'-bis(3-aminopropyl) ethylenediamine.

The silicon-containing triamine and the tetramine(s) are covalently cross-linked with the terephthaloyl chloride via interfacial polymerization to form a polyamide. Interfacial polymerization is a step-growth polymerization in which the polymerization occurs at the interface between two immiscible phases (generally two liquids), and the resulting polymer is constrained to the interface, comprising the interfacial layer. Variations of interfacial polymerization include, but are not limited to, polymer topologies of ultrathin films, nanocapsules, nanofibers, and the like. Interfacial polymerization may be used to prepare polyamides, polyanilines, polyimides, polyurethanes, polyureas, polypyrroles, polyesters, polycarbonates, and the like. During the interfacial polymerization process of the present disclosure, at least one primary amine of the silicon-containing triamine, and at least one of the primary amine of the tetramine and a secondary amine of the tetramine are covalently cross-linked with terephthaloyl chloride to form a polyamide. In an embodiment, one or more primary amines of the silicon-containing triamine may be covalently cross-linked with terephthaloyl chloride to one or more primary amines of the tetramine to form one or more polyamide linkages. In some embodiments, one or more primary amines of the silicon-containing triamine may be covalently cross-linked with terephthaloyl chloride to one or more secondary amines of the tetramine to form one or more polyamide linkages. In another embodiment, one or more primary amines of the tetramine may be covalently cross-linked with terephthaloyl chloride to one or more primary amines of the tetramine to form one or more polyamide linkages. In an embodiment, one or more primary amines of the tetramine may be covalently cross-linked with terephthaloyl chloride to one or more secondary amines of the tetramine to form one or more polyamide linkages. In some embodiments, one or more secondary amines of the tetramine may be covalently cross-linked with terephthaloyl chloride to one or more secondary amines of the tetramine to form one or more polyamide linkages. The current disclosure may include one or more and any combination of the above disclosed polyamide linkages, as well as polyamide linkages not specifically disclosed herein.

The reaction between triamine-functionalized copper oxide polysilicate mesoporous material ($NH_2$—CuO-MCM-41), tetramine, and the TPC forms a polyamide active layer with hyper-crosslinking of $NH_2$—CuO-MCM-41 in the first layer. During the complexation process, the copper oxide polysilicate backbone (CuO-MCM-41) of the triamine-functionalized copper oxide polysilicate mesoporous material ($NH_2$—CuO-MCM-41) is datively bonded to one or more tetramines; particularly, an amino terminus of the tetramine is coordinated to one or more copper atoms in the copper oxide polysilicate backbone. In a preferred embodiment, copper atoms will be datively bonded to the amino terminus of at least two tetramines. In a preferred embodiment, one or more carbon atoms of the one or more acyl groups of the diacyl compound is covalently bonded to one or more nitrogen atoms of the tetramines and the silicon-containing triamines. In some embodiments, one or more carbon atoms of the one or more acyl groups of the diacyl compound may be covalently boned to a primary amine of the tetramine. In some embodiments, one or more carbon atoms of the one or more acyl groups of the diacyl compound may be covalently bonded to a secondary amine of the tetramine. The tetramine may be covalently bonded to one or more carbon atoms of the one or more acyl groups of the diacyl compound in the polyamide active layer. In some embodiments, one or more carbon atoms of the one or more acyl groups of the diacyl compound may be covalently bonded to a primary amine of the silicon-containing triamine. In some embodiments, one or more diacyl compounds may be covalently bonded to one or more tetramines and one or more silicon-containing triamines in the polyamide active layer. The distribution and thickness of the polyamide active layer in the $NH_2$—CuO-MCM-41 is variable and dependent on the choice of the method, reaction conditions, and the concentration of the tetramine and the TPC. In an embodiment, the synthesis of the polyamide active layer of the filtration membrane has a ratio of the triamine-functionalized copper oxide polysilicate mesoporous material to N,N'-bis(3-aminopropyl) ethylenediamine of 1:1 to 1:50, preferably 1:5 to 1:50, more preferably 1:10 to 1:50, and yet more preferably 1:20 to 1:40 by weight. In an embodiment, the synthesis of the polyamide active layer of the filtration membrane has a ratio of the triamine-functionalized copper oxide polysilicate mesoporous material to terephthaloyl chloride of 1:1 to 1:50, preferably 1:5 to 1:50, more preferably 1:10 to 1:50, and yet more preferably 1:20 to 1:40 by weight. The polyamide active layer may contain a molar ratio of the tetramine to the diacyl compound of 1:1 to 1:10, preferably 1:1 to 1:5, and more preferably 1:1 to 1:2. The polyamide active layer may contain a molar ratio of the silicon-containing triamine of the triamine-functionalized polysilicate copper oxide mesoporous material to the diacyl compound of 1:1 to 1:10, preferably 1:1 to 1:5, and more preferably 1:2 to 1:4. The polyamide active layer may be of greater thickness than the triamine-functionalized polysilicate copper oxide mesoporous material. The polyamide active layer may have a thickness of 50 to 5000 nm, preferably 100 to 5000 nm, more preferably 100 to 3000 nm, and yet more preferably 100 to 2000 nm.

The membrane further includes a second layer and a third layer, forming the support. Generally, the support should possess good mechanical and thermal properties. Also, the support should demonstrate high resistance to chemicals such as aromatic hydrocarbons, ketones, ethers, and esters. In some embodiments, the support may be formed of polymeric materials such as polysulfone (PS), polyethersulfone (PES), polyethylene terephthalate or polyester terephthalate (PET), or a combination thereof. In some embodiments, certain other polymeric support materials such as poly (ether sulfone) (PSF), polyacrylonitrile (PAN), polypropylene (PP), polyvinylidene fluoride (PVDF), polytetrafluoroethylene (PTFE), polyimide (PI), and poly (arylene ether nitrile ketone) (PPENK), may be used alone or in combination with the polysulfone, polyethersulfone, polyethylene terephthalate, and polyester terephthalate.

In some embodiments, the second layer includes PS. In some embodiments, the third layer includes PET. To prepare the support (PS/PET), the PS and the PET were mixed in various weight ratios to obtain the support with desired chemical, mechanical, and thermal properties. Although the description herein refers to the use of PS/PET support, it may be understood by a person skilled in the art that other polymeric supports may be used as well, albeit with a few variations, as may be evident to a person skilled in the art. The support may be prepared by any of the conventional methods known in the art—for example, the phase inversion method or the electrostatic spinning method. In a preferred embodiment, the PS/PET support is prepared by the phase inversion method. Phase inversion is a process in which membranes are fabricated. Phase inversion is performed by removing solvent from a liquid polymer solution, leaving a porous, solid membrane. Phase inversion may be carried out through reducing the temperature of the solution, immersing the polymer solution into an anti-solvent, exposing the polymer solution to a vapor of anti-solvent, evaporating the solvent in atmospheric air, evaporating the solvent at high temperature, and a combination thereof. A mean pore diameter and pore diameter distribution may be varied and dependent on a rate at which phase inversion occurs.

To fabricate the membrane, a certain amount of triamine-functionalized copper oxide polysilicate mesoporous material was dispersed in an aqueous solution of multifunctional, linear aliphatic amine N,N'-bis(3-aminopropyl) ethylenediamine (tetramine). The tetramine was in an amount from 1 to 10% (wt/v), preferably 1 to 5% (wt/v), more preferably 1 to 3% (wt/v), and yet more preferably about 2% (wt/v). A strong base, preferably triethylamine, was then added to the aqueous solution. The aqueous solution was sonicated for 5 to 60 minutes, preferably 10 to 40 minutes, more preferably 15 to 30 minutes, and yet more preferably about 20 minutes. In a preferred embodiment, the aqueous solution was probe-sonicated. A homogeneous aqueous amine solution was formed after sonication. Then, the interfacial polymerization (IP) was carried out on the ultrafiltration support (prepared by phase inversion), PS/PET, using a linear cross-linker TPC dissolved in n-hexane. The linear cross-linker TPC was dissolved in n-hexane in an amount of 1 to 10% (wt/v), preferably 1 to 5% (wt/v), more preferably 1 to 3% (wt/v), and yet more preferably about 2% (wt/v). The IP reaction led to the formation of $NH_2$—CuO-MCM-41 covalently decorated polyamide active layer of the membrane.

Morphological analysis of a two-dimensional sample of the membrane reveals a uniform distribution of carbon, nitrogen, oxygen, copper, and silicon in the first layer of the filtration membrane. This confirms the successful incorporation of CuO into the copper oxide polysilicate backbone and the first layer of the membrane. Surface roughness is yet another parameter determining the performance of the membrane. Rougher surfaces tend to foul because of the accumulation of foulants in the valleys, which reduces the permeate quality and flow rate. Therefore, having a membrane with a smooth surface is desirable. In some embodiments, the membrane of the present disclosure has a surface roughness (Ra) in a range of 7 nm to 17 nm.

The success of the fabrication process was further shown based on water contact angle (WCA). Generally, if the WCA is smaller than 90°, the membrane is considered hydrophilic; if the WCA is larger than 90°, the membrane is considered hydrophobic. The pristine membrane (PA@PS/PET) was more hydrophobic than the membranes of the current disclosure with a WCA of about 83.2°; however, the WCA was reduced after upon addition of $NH_2$—CuO-MCM-41 in the membrane. This can be attributed to the hydrophilic nature of $NH_2$—CuO-MCM-41, mainly due to incorporation of CuO and presence of several hydroxyl groups on the surface of CuO-MCM-41 and several amine groups of $NH_2$—CuO-MCM-41. As a result, the membrane of the present disclosure has a WCA of less in a range of 60° to 80°, which indicates its hydrophilic nature. Also, the membrane of the present disclosure has improved water flux which was achieved by increasing the hydrophilicity of the membrane. The rate of flux of the membrane was found to be in a range of 15 to 85 L m$^{-2}$ h$^{-1}$ at a pressure of 25 bar.

According to another aspect of the present disclosure, a nanofiltration method is described. The method includes contacting a water composition, including water, salts, and pharmaceuticals, with the filtration membrane. The salts may include inorganic ions and organic ions. The salts may include monatomic ions and polyatomic ions. The salts may include positively changed cations with charges of +1, +2, +3, +4, +5, +6, and +7. The salts may include negatively charged anions with charges of −1, −2, −3, and −4. The salts include one or more of $MgCl_2$, $MgSO_4$, $CaCl_2$), $Na_2SO_4$, and NaCl. The pharmaceuticals may include organic compounds and salts of the organic compounds, preferably organic compounds having one or more aryl groups. The pharmaceuticals may include functional groups such as alkanes, alkenes, alkynes, aromatic rings, alcohols, esters, ethers, ketones, aldehydes, carboxylic acids, amines, amides, alkyl halides, thiols, the like, and any combination thereof. The pharmaceuticals may have a molecular weight of 100 to 1000 g/mol, preferably 100 to 700 g/mol, and more preferably 150 to 550 g/mol. The pharmaceuticals may have a rigid molecular structure and a flexible molecular structure. Suitable examples of pharmaceuticals include caffeine, sulfamethoxazole, amitriptyline, and loperamide. After contacting the water composition with the filtration membrane, a permeate passes through the membrane. The membrane has a rejection profile of salts from 55% by weight to 99% by weight; and a rejection profile of pharmaceuticals from 60% by weight to 80% by weight.

EXAMPLES

The following examples demonstrate the filtration membrane as described herein. The examples are provided solely for illustration and are not to be construed as limitations of the present disclosure, as many variations thereof are possible without departing from the spirit and scope of the present disclosure.

Example 1: Materials

Cetyltrimethylammonium bromide (CTAB), tetraethyl orthosilicate (TEOS), sodium hydroxide (NaOH), $N^1$-(3-trimethoxy silylpropyl) diethylenetriamine (NTSDETA), triethylamine (TEA), N,N'-bis(3-aminopropyl) ethylenediamine, terephthaloyl chloride (TPC), polysulfone (PS), n-hexane, and ethanol were purchased from Sigma Aldrich. Copper (II) methoxyethoxyethoxide was purchased from Gelest USA. Deionized (DI) water was used throughout the experimentation obtained from an in-lab setup. Salts ($MgSO_4$, $MgCl_2$, $CaCl_2$), $Na_2SO_4$, NaCl) and pharmaceutical drugs (caffeine, sulfamethoxazole, amitriptyline, and loperamide) were also procured from Sigma Aldrich.

Example 2: Characterization

The materials and membrane were characterized using attenuated total reflectance-Fourier-transform infrared spectroscopy (ATR-FTIR: Thermo Nicolet iS50) (manufactured by Thermo Fisher Scientific, 168 Third Avenue. Waltham, MA USA 02451) and powdered X-ray diffractometer (PXRD: manufactured by Rigaku Miniflex-II, 2601A, Tengda Plaza, No. 168, Xizhimenwai Ave). The remaining membrane features were evaluated using a scanning electron microscope (SEM: JEOL Rigaku Miniflex-II, manufactured by Rigaku Miniflex-II, 2601A, Tengda Plaza, No. 168, Xizhimenwai Ave), a water contact angle instrument (WCA: KRUSS DSA25, manufactured by Kruss, Alsterdorfer Str. 276-278, 22297 Hamburg, Germany), and an atomic force microscope (AFM Aglient 550, manufactured by Aglilent, 5301 Stevens Creek Blvd Santa Clara, CA 95051, United States). A copper complex formation with amine was assessed using a JASCO V-750 UV-Vis spectrophotometer (manufactured by Jasco Corporation, 2967-5, Ishikawamachi, Hachioji, Tokyo 192-8537, Japan). Feed and permeate samples of pharmaceutical drugs (caffeine, sulfamethoxazole, amitriptyline, loperamide) and salts ($MgSO_4$, $MgCl_2$, $CaCl_2$), $Na_2SO_4$, NaCl) were analyzed using UV-Vis spectrophotometer and conductivity meter (Ultrameter II, Hanna; manufactured by Hanna Instruments, 270 George Washington Hwy, Smithfield, Rhode Island, 02917, United States), respectively.

Example 3: Synthesis of CuO-MCM-41

FIG. 1A is a schematic illustration depicting a synthetic route for preparation of CuO-MCM-41 using tetraethyl orthosilicate (TEOS) and copper methoxy ethoxide, according to an aspect of the present disclosure. Copper oxide-modified MCM-41 was synthesized (Rahimi, et. al., 2021. A new anti-fouling polysulphone nanofiltration membrane blended by amine-functionalized MCM-41 for post treating waste stabilization pond's effluent. J. Environ. Manage. 290, 112649, incorporated herein by reference in its entirety) by stirring 0.125 g of CTAB into 120 mL of 2 M NaOH at 80° C. for 30 minutes. Subsequently, 2.48 mL of TEOS and 3.36 mL of copper (II) methoxyethoxyethoxide were added gradually while stirring for 8 hours. The resulting precipitates were centrifuged, washed using ethanol, and dried at 100° C. for 10 h to obtain CuO-MCM-41 (as shown in FIG. 1A).

Example 4: Amine Functionalization of CuO-MCM-41

Figure 1B:
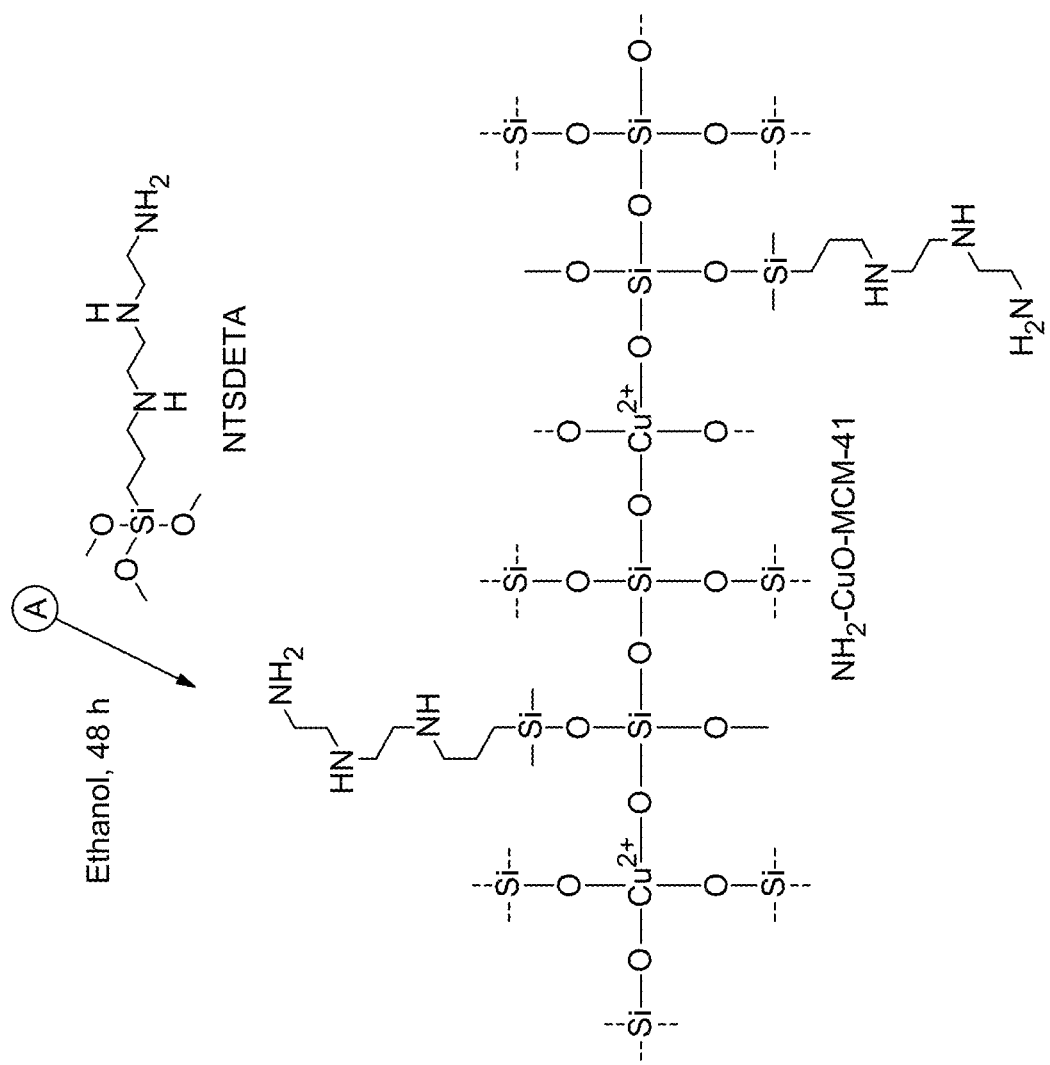
FIG. 1B is a schematic illustration depicting the amine-functionalization route of copper oxide covalently linked in silica framework (CuO-MCM-41) using $N^1$-(3-trimethoxy silylpropyl) diethylenetriamine (NTSDETA) to form amine functionalized copper oxide covalently linked in silica framework (NH$_2$—CuO-MCM-41), according to an aspect of the present disclosure.

FIG. 1B is a schematic illustration depicting the amine-functionalization route of CuO-MCM-41 using NTSDETA to form $NH_2$—CuO-MCM-41. The synthesized CuO-MCM-41 (described with reference to FIG. 1A) was further modified through amine functionalization (Ahangaran, F., Navarchian, A. H., 2020. Recent advances in chemical surface modification of metal oxide nanoparticles with silane coupling agents: A review. Adv. Colloid Interface Sci. 286, incorporated herein by reference in its entirety). For functionalization, 0.45 g of CuO-MCM-41 was taken in a round bottom flask, and 50 mL of ethanol (98%) was added to the round bottom flask. The mixture in the round bottom flask was probe-sonicated for 30 minutes. Subsequently, 1 mL of $N^1$-(3-trimethoxy silylpropyl) diethylenetriamine (NTSDETA) was added slowly to the mixture. The resulting solution was subjected to stirring at room temperature for 48 hours. Finally, the resulting product was washed with ethanol and dried at 100° C. for 10 hours to obtain $NH_2$—CuO-MCM-41 (FIG. 1B).

Example 5: Membrane Fabrication Using Amine-Functionalized CuO-MCM-41

Three membrane configurations contained 0%, 0.05%, and 0.1% of $NH_2$—CuO-MCM-41. Therefore, three aqueous amine solutions were prepared by adding 0 g, 0.05 g, and 0.1 g of $NH_2$—CuO-MCM-41 by mixing with (N, N'-bis(3-aminopropyl) ethylenediamine) (2% wt./v) and 4.0 mL of triethylamine (TEA). The solutions were thoroughly homogenized by using probe-sonication for 20 minutes. Upon probe sonication, the aqueous amine solution turned blue. Colorimetric analysis revealed that the intensity of the blue color was related to the amount of $NH_2$—CuO-MCM-41 added to the amine solution. The absorption spectra of the blue-colored amine solutions were recorded using a UV-visible spectrophotometer. Similarly, a 2% (wt./v) n-hexane solution of terephthaloyl chloride (TPC) was prepared for interfacial polymerization (IP) process.

Polysulfone supports were prepared by phase inversion on unwoven polyester terephthalate (PET). The polysulfone supports was fixed on flat glass sheets and were immersed for 10 minutes into aqueous $NH_2$—CuO-MCM-41 containing amine solutions with continuous shaking. Next, the membranes were removed from the aqueous solution, and the excess amine solutions were removed using a rubber roller. Next, the membranes were immersed in 0.2% terephthaloyl chloride (TPC) of n-hexane solution for 2 minutes to complete the IP process. Subsequently, the membranes were removed from the n-hexane solution, washed with clean n-hexane, and kept inside the oven for 1 hour for further crosslinking at 80° C. Subsequently, the membranes were removed and kept in water for 24 hours before testing. Three membranes were prepared and named 0.0%-CuO-MCM-41/PA@PS/PET, 0.05%-CuO-MCM-41/PA@PS/PET, and 0.10%-CuO-MCM-41/PA@PS/PET based on added amount of $NH_2$—CuO-MCM-41.

Results and Discussion

Synthesis of CuO-MCM-41 and $NH_2$—CuO-MCM-41

Figure 2A:
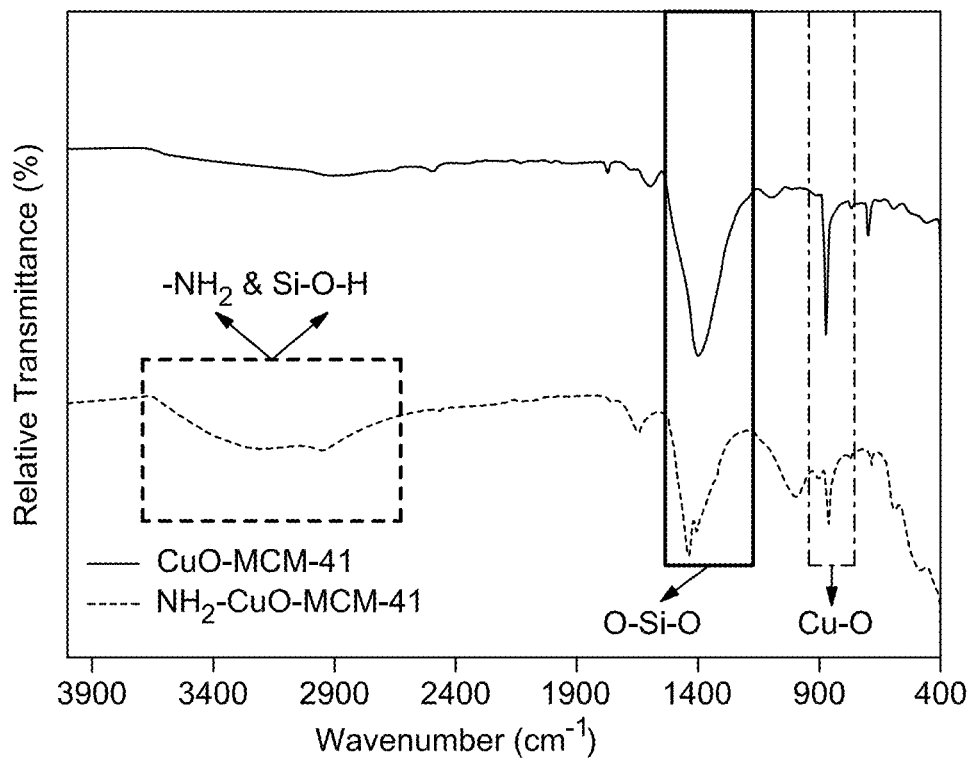
FIG. 2A illustrates attenuated total reflectance-Fourier-transform infrared (ATR-FTIR) pattern of CuO-MCM-41 and NH$_2$—CuO-MCM-41, according to an aspect of the present
Figure 2B:
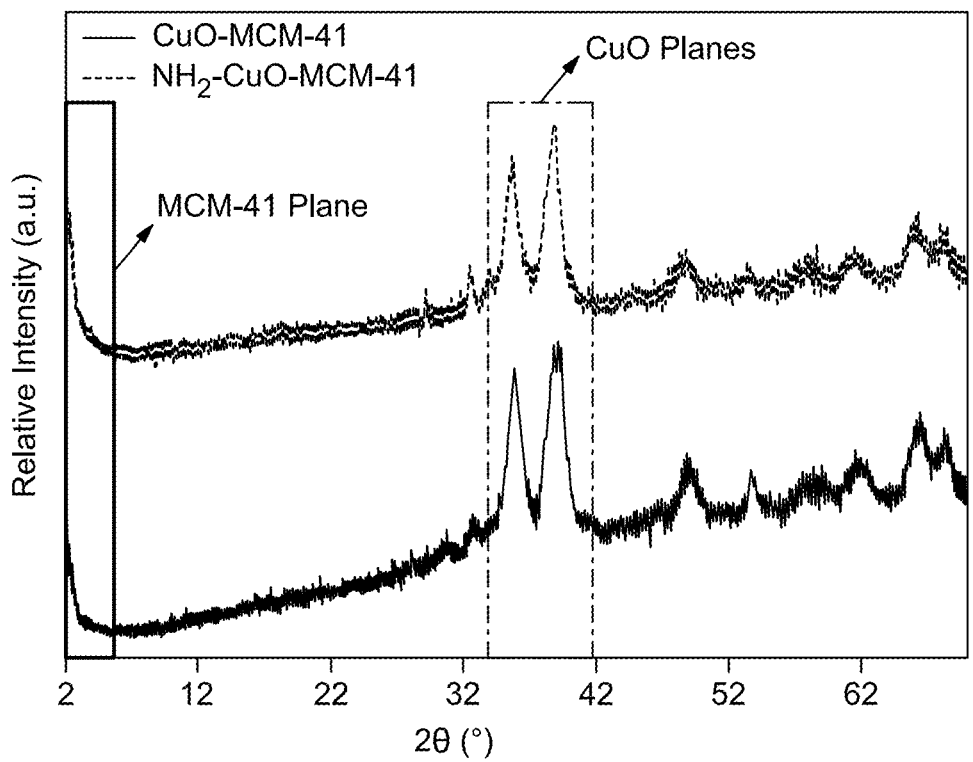
FIG. 2B illustrates Powder X-ray diffraction (PXRD) pattern of CuO-MCM-41 and NH$_2$—CuO-MCM-41, according to an aspect of the present disclosure.

The structure of CuO-MCM-41 and $NH_2$—CuO-MCM-41 was characterized by ATR-FTIR, as shown in FIG. 2A and FIG. 2B. The FTIR scan of CuO-MCM-41 showed the presence of a band in a region of 1400 cm-1, which were attributed to the presence of O—Si—O bonds, while a band at around 900 cm-1 and 800 cm-1 might be due to presence of Cu—O (FIG. 2A). After functionalization of the CuO-MCM-41 with NTSDETA, a new band appeared in the region of 3600 cm-1 to 3000 cm-1 which were attributed to amine (—$NH_2$) functionalization of $NH_2$—CuO-MCM-41 and Si—O—H bonds (FIG. 2A). The PXRD patterns of CuO-MCM-41 and $NH_2$—CuO-MCM-41 are illustrated in FIG. 2B. An edge of the low angle region of MCM-41 was observed at 2° while strong diffraction peaks were observed at 38° and 40° due to CuO crystal planes. Similarly, several other characteristic diffraction peaks of CuO were also found in the PXRD pattern. However, upon functionalization, the intensity of all of the peaks of MCM-41 and CuO was lowered, thereby indicating the successful functionalization of CuO-MCM-41, leading to $NH_2$—CuO-MCM-41.

Figure 3A:
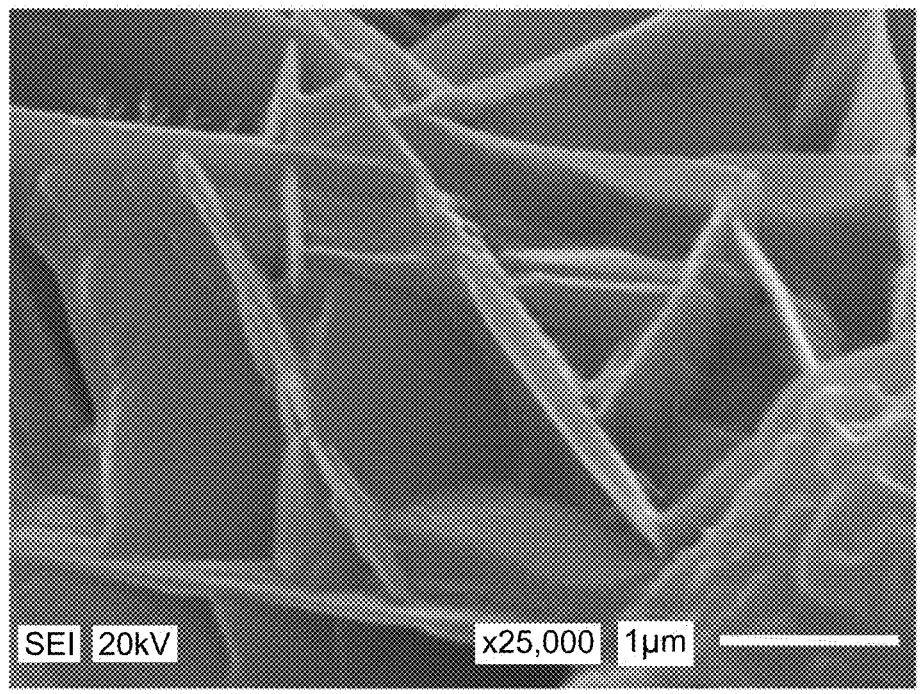
FIG. 3A is a scanning electron microscopic (SEM) image of CuO-MCM-41, according to an aspect of the present disclosure.
Figure 3B:
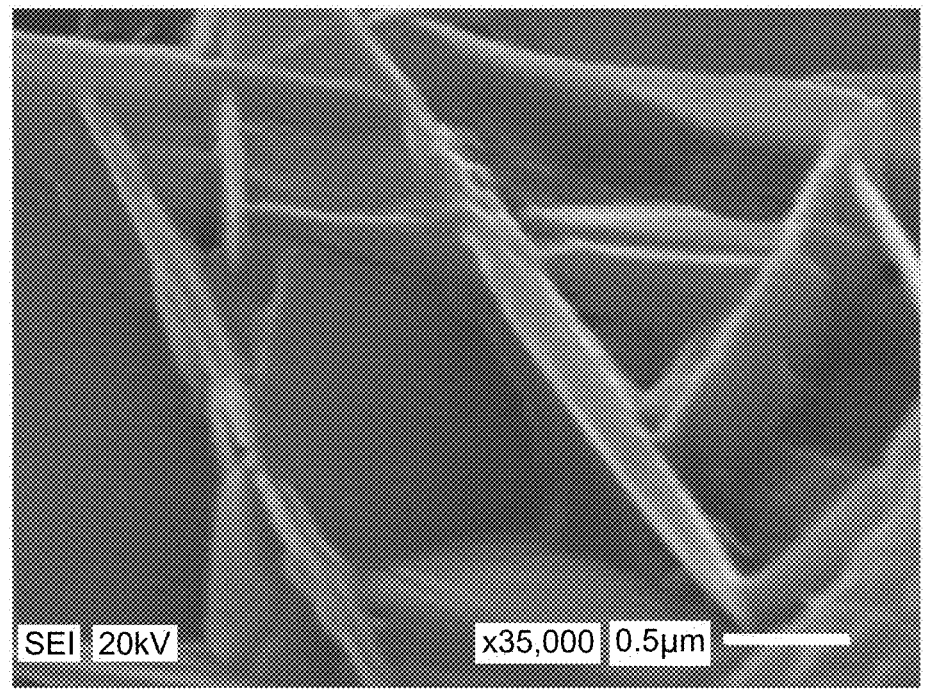
FIG. 3B is an enlarged portion of the SEM image of FIG. 3A, according to an aspect of the present disclosure.
Figure 3C:
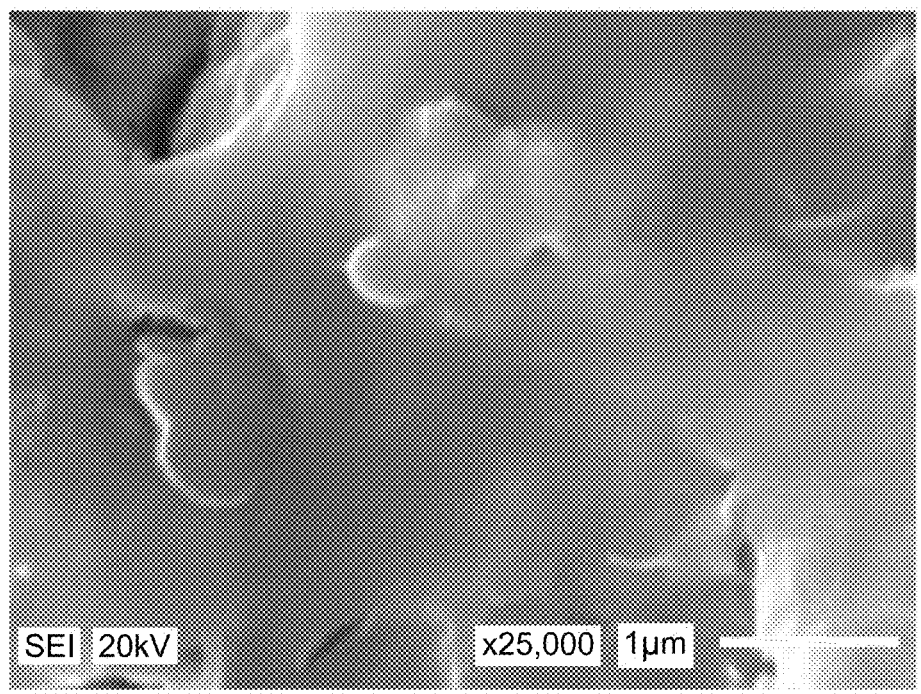
FIG. 3C is an SEM image of NH$_2$—CuO-MCM-41, according to an aspect of the present disclosure.
Figure 3D:
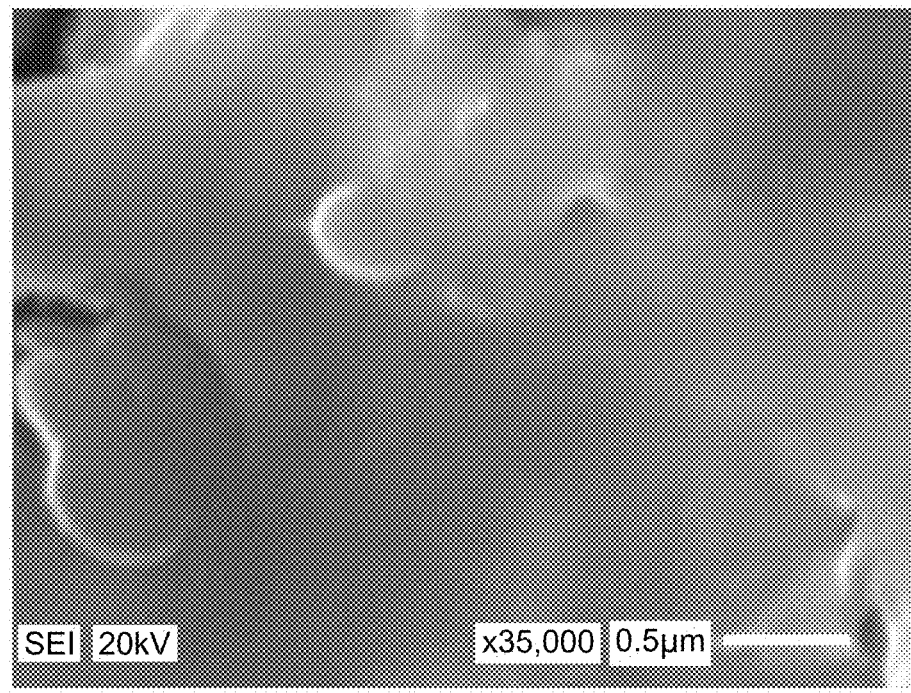
FIG. 3D is an enlarged portion of the SEM image of FIG. 3C, according to an aspect of the present disclosure.
Figure 3E:
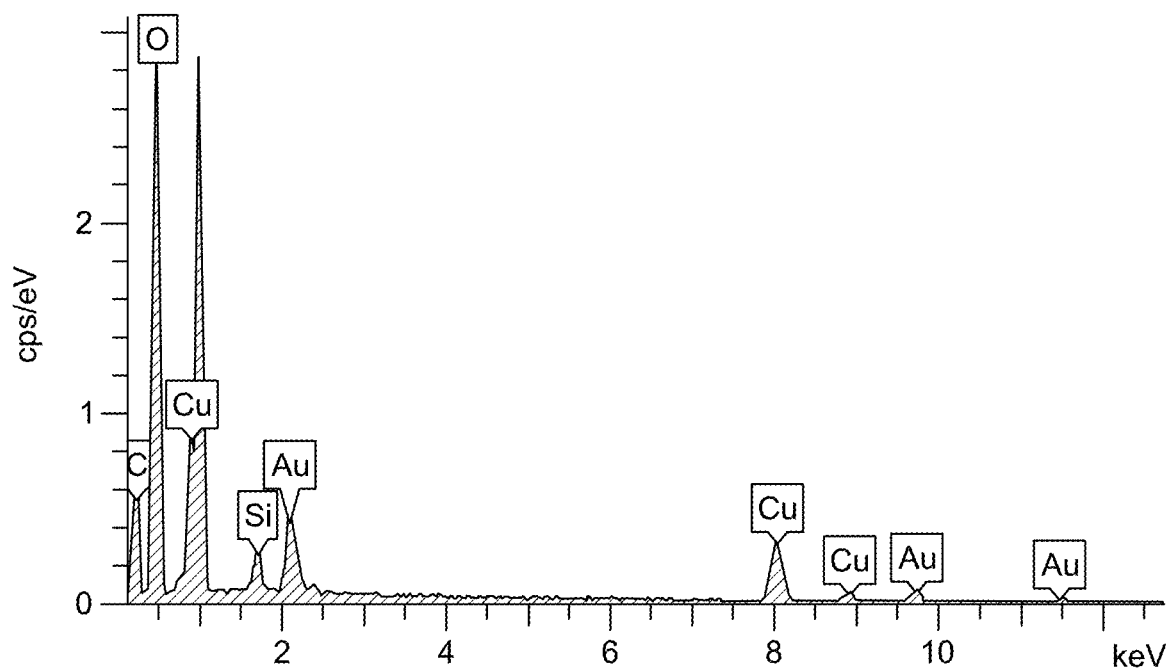
FIG. 3E depicts energy dispersive X-ray spectroscopic analysis (EDX) of CuO-MCM-41, according to an aspect of the present disclosure.
Figure 3F:
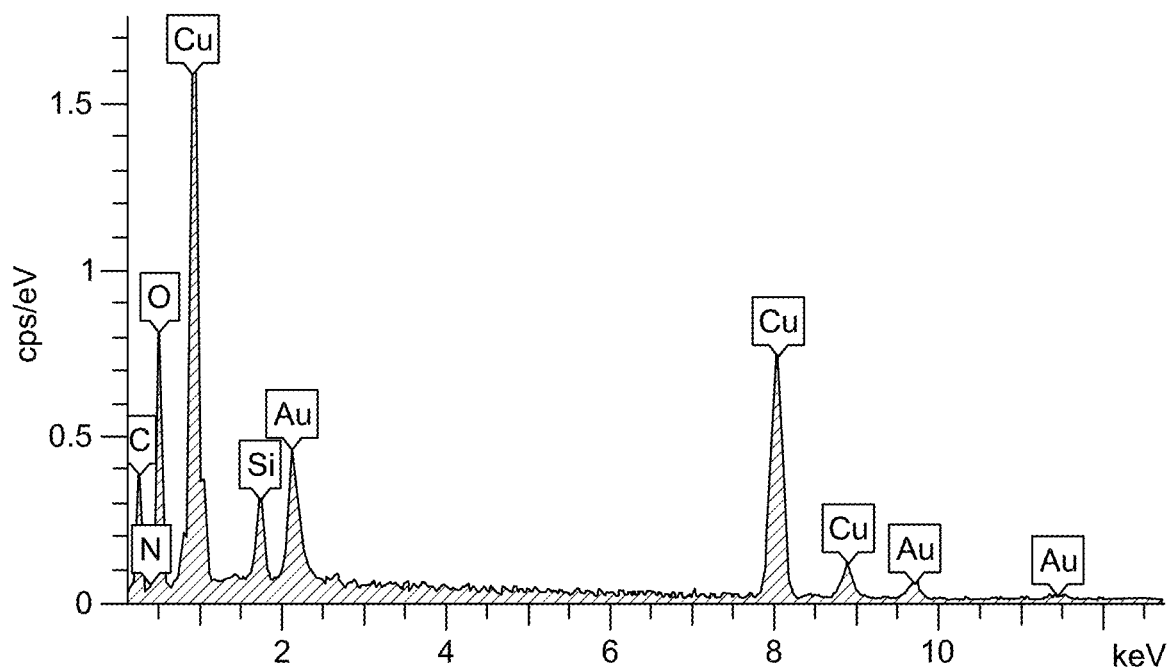
FIG. 3F depicts EDX analysis of NH$_2$—CuO-MCM-41, according to an aspect of the present disclosure.

The morphology of CuO-MCM-41 and $NH_2$—CuO-MCM-41 was explored by SEM micrographs, as depicted in FIG. 3A through FIG. 3D. The micrographs of CuO-MCM-41 showed a textured appearance with a certain pattern showing regular edges and depressions (FIG. 3A and FIG. 3B). However, after the amine functionalization, $NH_2$—CuO-MCM-41 micrographs revealed a smooth surface compared to CuO-MCM-41 which confirmed the successful functionalization of CuO-MCM-41 (FIG. 3C and FIG. 3D). For an enhanced analysis of the chemical composition of CuO-MCM-41 and $NH_2$—CuO-MCM-41, EDX analysis was carried out where it was found that all of the anticipated elements, such as silicon (Si), copper (Cu), carbon (C) and oxygen (O), were present in case of CuO-MCM-41 (FIG. 3E) while additional element nitrogen (N) was also found in case of $NH_2$—CuO-MCM-41 (FIG. 3F). The presence of N in addition to all other elements is a confirmation of functionalization leading to $NH_2$—CuO-MCM-41.

Figure 4A:
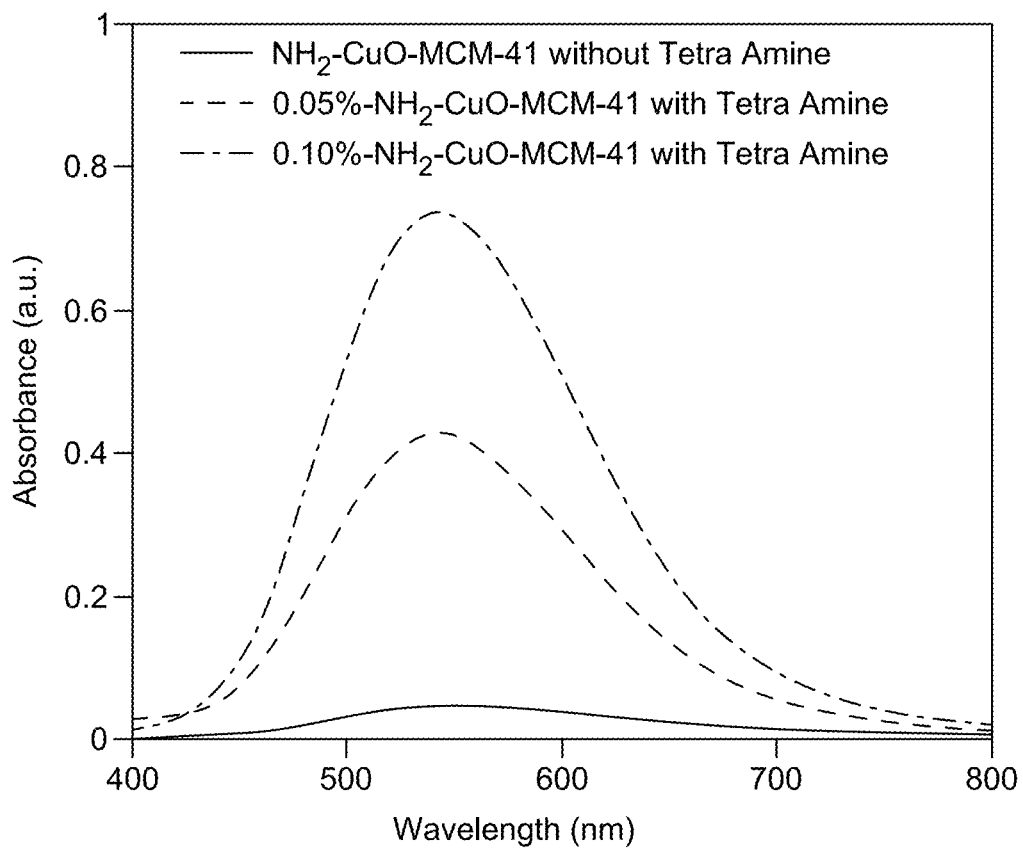
FIG. 4A depicts absorption spectra of NH$_2$—CuO-MCM-41 and solutions of N, N'-bis(3-aminopropyl) ethylenediamine with NH$_2$—CuO-MCM-41, according to an aspect of the present disclosure.
Figure 4B:
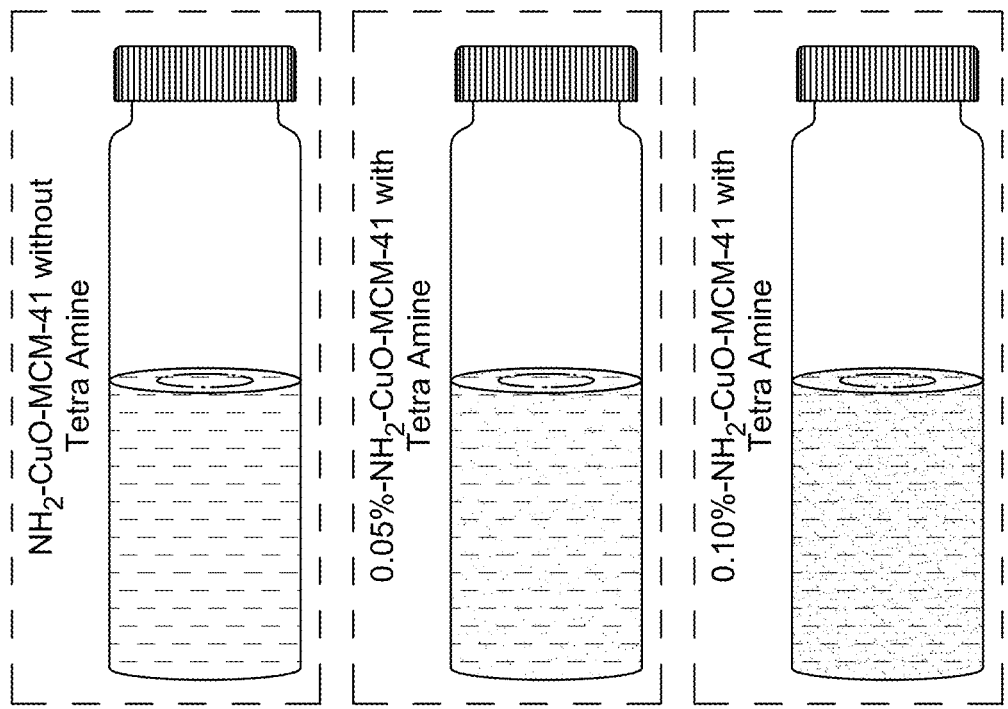
FIG. 4B illustrates experimental samples of the solutions in FIG. 4A, according to an aspect of the present disclosure.

Upon sonication of the solution of $NH_2$—CuO-MCM-41 after adding N, N'-bis(3-aminopropyl) ethylenediamine, a change in coloration was also observed. The absorption spectra of an aqueous solution of pristine $NH_2$—CuO-MCM-41 solution and its mixture with N, N'-bis(3-aminopropyl) ethylenediamine are given in FIG. 4A. It can be seen that the absorption intensity increased with increasing concentration of $NH_2$—CuO-MCM-41 with an absorption maxima at 550 nm. Experimental samples are illustrated in FIG. 4B, where it can be seen that the original solution of $NH_2$—CuO-MCM-41 was brown colored while the addition of N, N'-bis (3-aminopropyl) ethylenediamine led to blue color after sonication. The corresponding blue color was deeper with a higher concentration of N, N'-bis(3-aminopropyl) ethylenediamine in the solution of $NH_2$—CuO-MCM-41.

Figure 5:
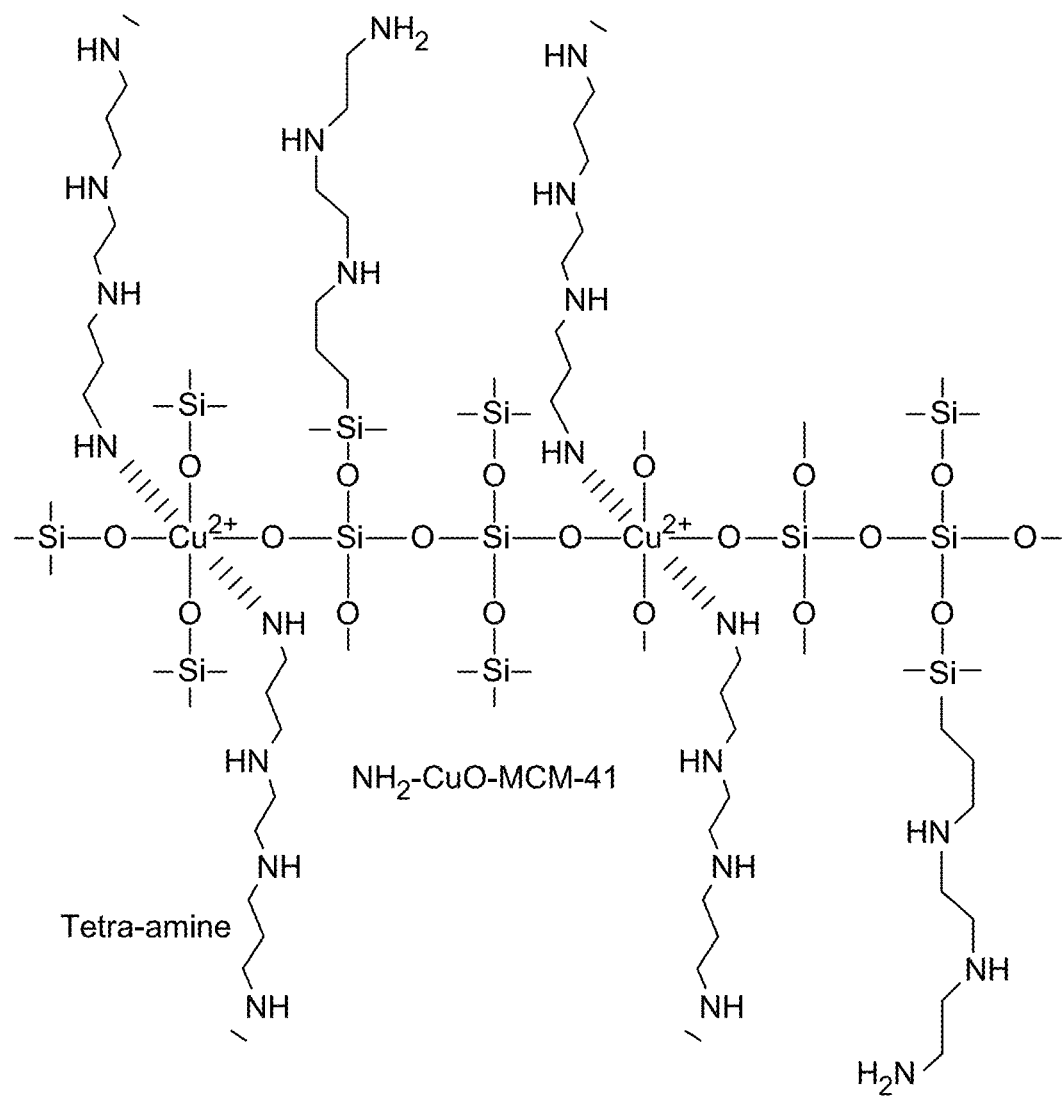
FIG. 5 is a schematic illustration depicting possible interaction between NH$_2$—CuO-MCM-41 and N, N'-bis(3-aminopropyl) ethylenediamine, according to an aspect of the present disclosure.

The change in color of the $NH_2$—CuO-MCM-41 solution upon the addition of N, N'-bis (3-aminopropyl) ethylenediamine may be attributed to the interaction of lone pairs on nitrogen atoms of N, N'-bis(3-aminopropyl) ethylenediamine and $Cu^{2+}$ of $NH_2$—CuO-MCM-41 as shown in FIG. 5. A possible structure of the complex between N, N'-bis(3-aminopropyl) ethylenediamine and $Cu^{2+}$ can not only lead to stabilization of $Cu^{2+}$ in the membrane matrix but also assists in IP reaction during fabrication of the filtration membrane.

Fabrication of x-CuO-MCM-41/PA@PS/PET Membranes

Figure 6A:
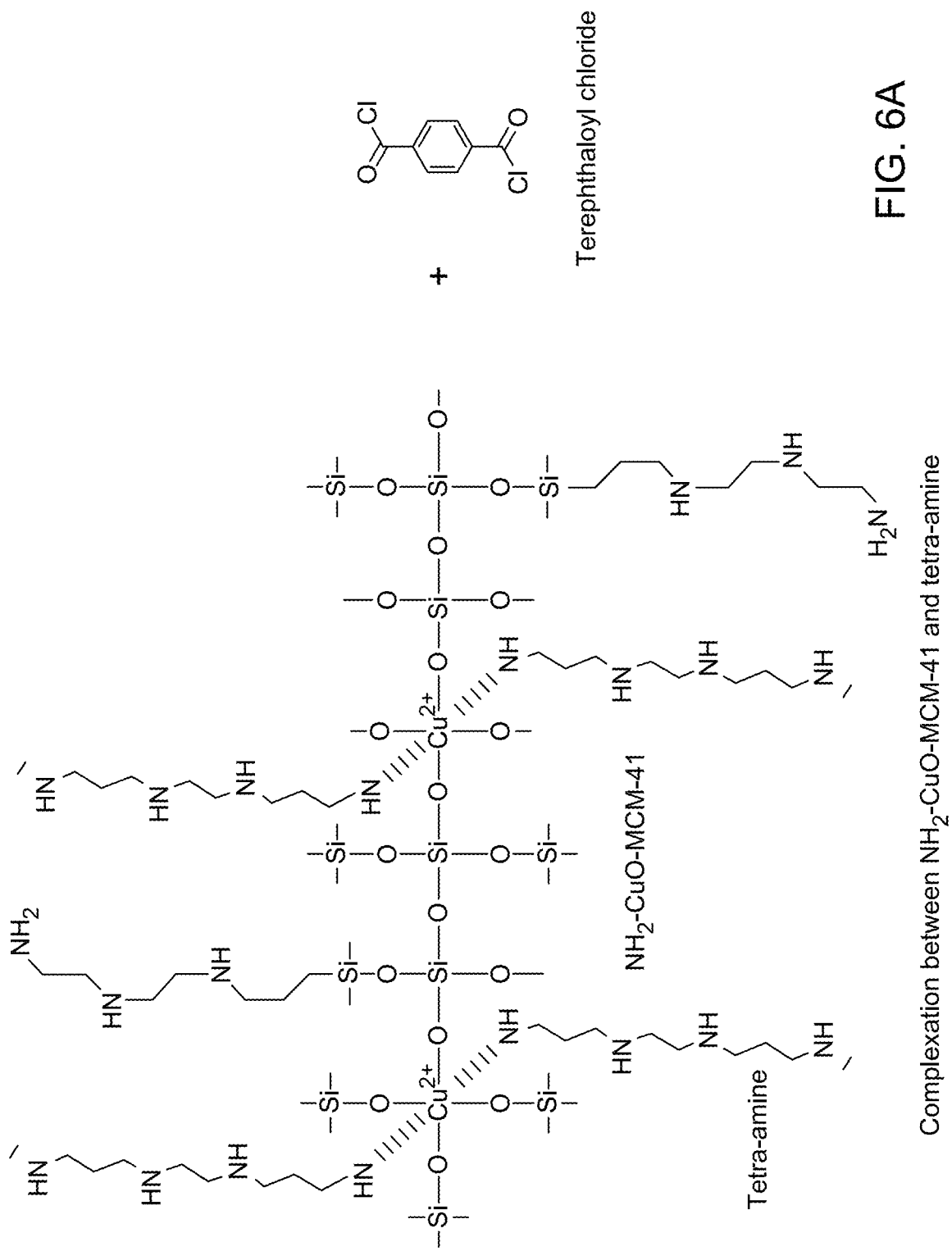
FIG. 6A is a schematic illustration depicting a synthetic route for the preparation of NH$_2$—CuO-MCM-41 covalently decorated polyamide (PA) active layer using NH$_2$—CuO-MCM-41 and terephthaloyl chloride, according to an aspect of the present disclosure.
Figure 6B:
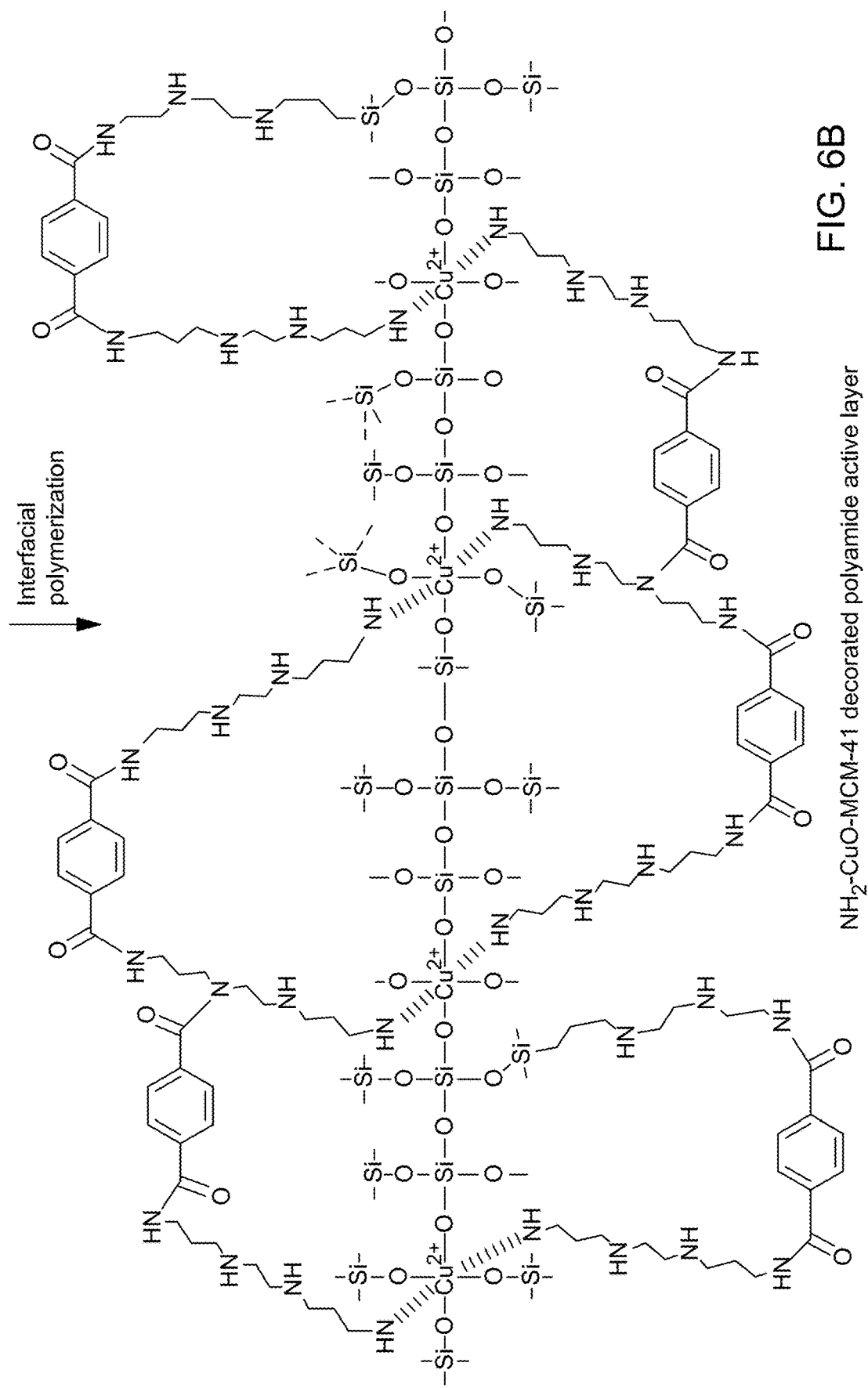
FIG. 6B is a schematic illustration depicting the possible structure of NH$_2$—CuO-MCM-41 covalently decorated polyamide (PA) active layer resulting from the synthesis depicted in FIG. 6A, according to an aspect of the present disclosure.

The membranes were fabricated through IP reaction using terephthaloyl chloride (TPC) as a crosslinker. Crosslinking may efficiently occur due to amine functional groups in the structure of $NH_2$—CuO-MCM-41 and tetramine, which reacts abruptly with acid chloride (—COCl) functional groups of TPC. The reaction between $NH_2$—CuO-MCM-41, N, N'-bis(3-aminopropyl) ethylenediamine, and TPC forms a polyamide active layer with hyper-crosslinking of CuO-MCM-41 in the active layer as shown below in FIG. 6A and FIG. 6B. Choice of using $N^1$-(3-trimethoxy silylpropyl) diethylenetriamine as a functionalizing agent was to link the CuO-MCM-41 with a linker having multiple amine functional groups, which may eventually crosslink with the TPC. Moreover, including N, N'-bis(3-aminopropyl) ethylenediamine as an additional amine enabled extensive crosslinking during IP, leading to a dense polyamide active layer covalently decorated with CuO-MCM-41.

Figure 7:
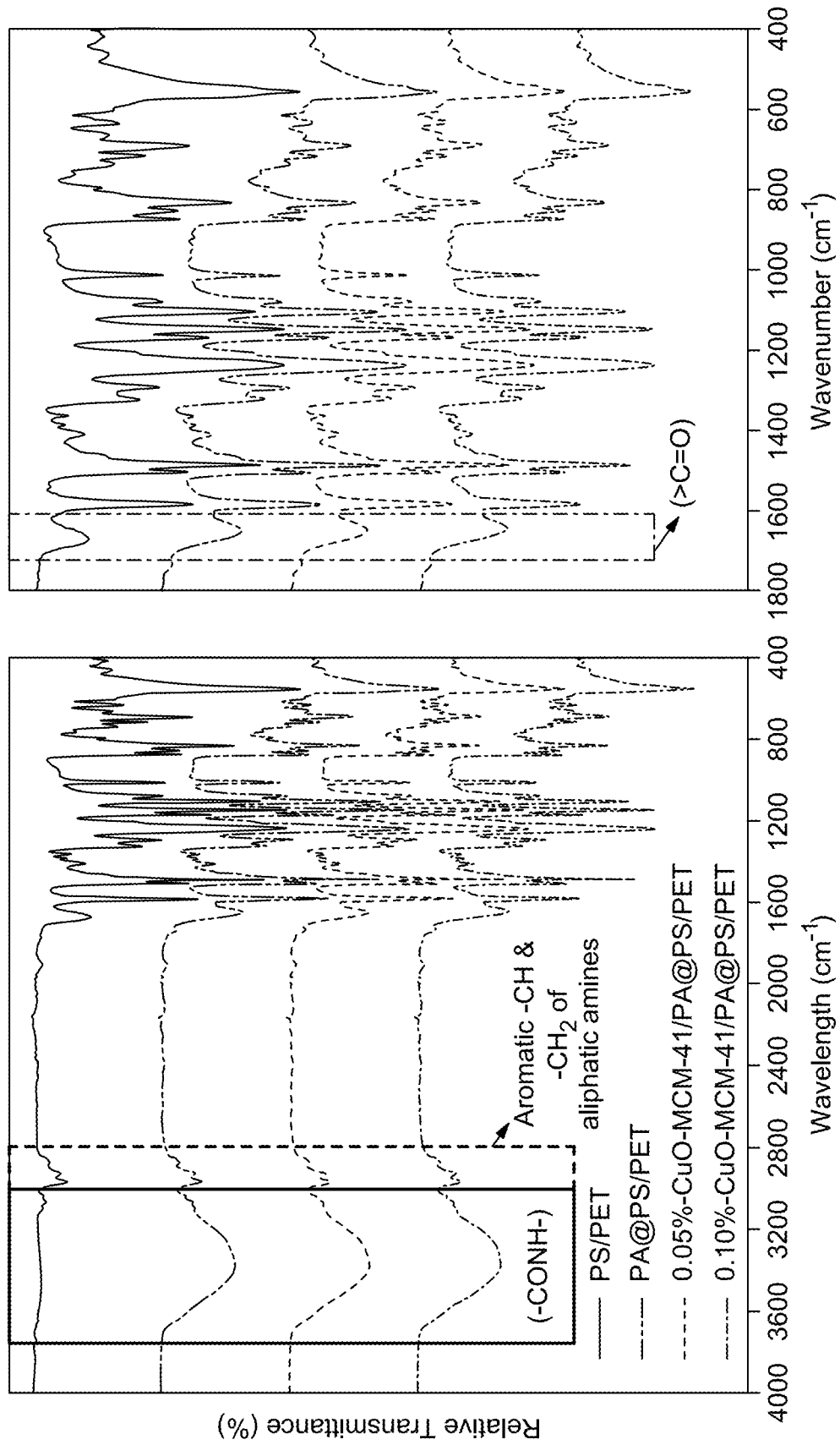
FIG. 7 illustrates, on the left-hand side, ATR-FTIR of various membranes, namely, PS/PET support, PA@PS/PET, 0.05%-CuO-MCM-41/PA@PS/PET, and 0.10%-CuO-MCM-41/PA@PS/PET and, on the right-hand side, fingerprint region of all the spectra, according to an aspect of the present disclosure.

Upon successful fabrication of the membranes, the characterization was carried out by several techniques, including ATR-FTIR, AFM, WCA, SEM, and EDX analysis. The presence of different functional groups in the membrane was supported by ATR-FTIR for all of the membranes, as represented in FIG. 7. PS/PET failed to show any peak in the region of 3650 cm-1 and 3150 cm-1, while all of the other fabricated membranes showed a broad peak in the same region supporting the formation of amide linkage (—CONH—). As seen in FIG. 7, the amide peak of the active polyamide layer overlaps with the amine (—$NH_2$) peak of $NH_2$—CuO-MCM-41, thereby confirming the contribution of $NH_2$—CuO-MCM-41 in membrane fabrication. The other peak at 3000 cm-1 was due to-CH bonds of aromatic polysulfone and TPC rings, and the peak at 2900 cm-1 was attributed to —$CH_2$ of aliphatic amines.

Figure 8:
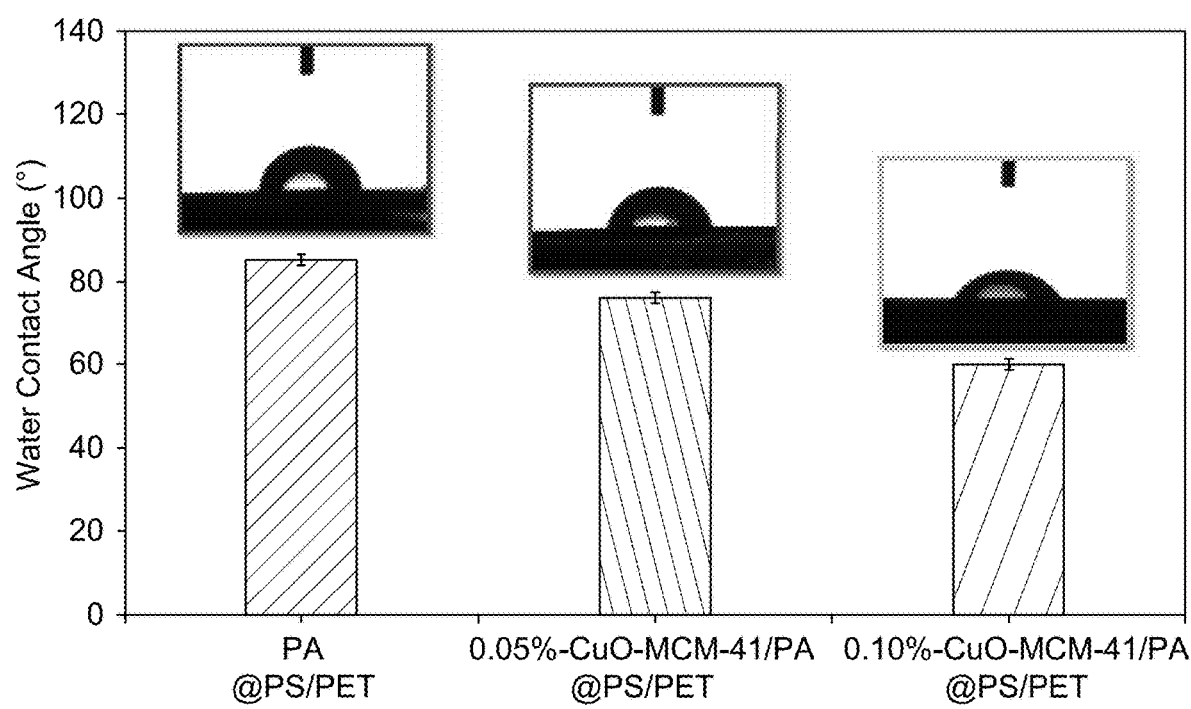
FIG. 8 illustrates water contact angle of various membranes, PA@PS/PET, 0.05%-CuO-MCM-41/PA@PS/PET, and 0.10%-CuO-MCM-41/PA@PS/PET, according to an aspect of the present disclosure.
Figures 9A, 9B:
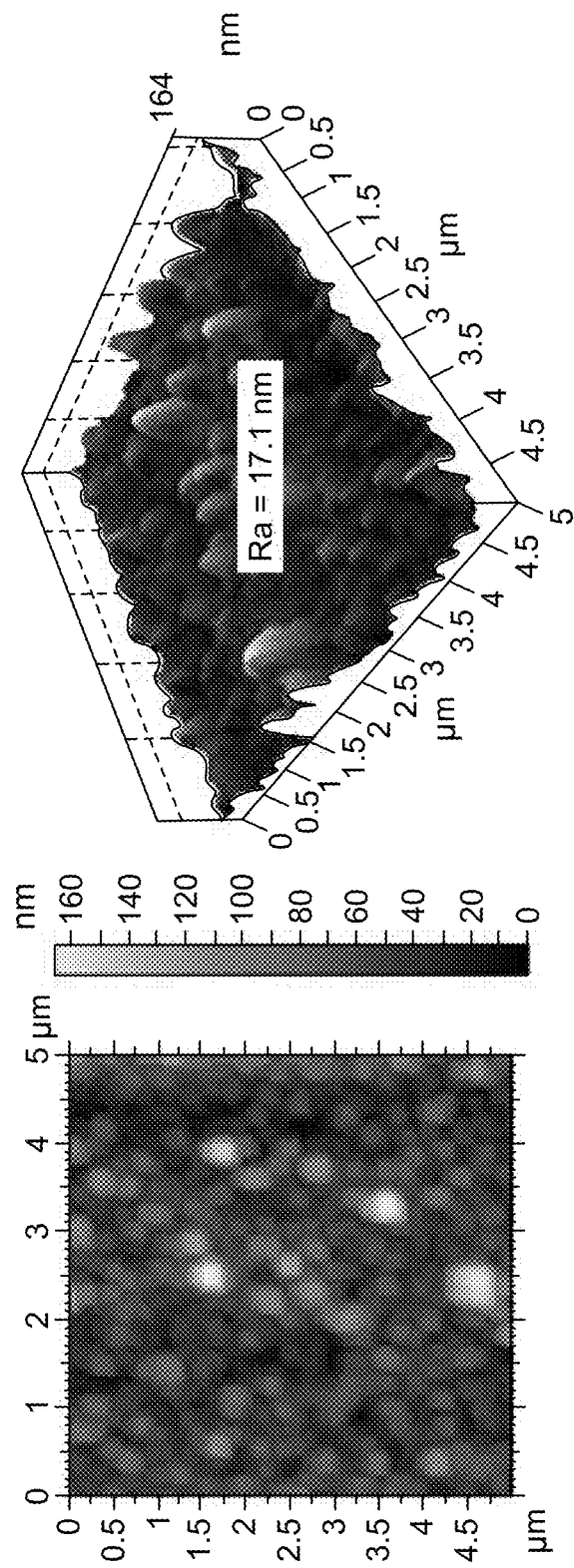
FIG. 9A is an atomic force microscopy (AFM) image of PA@PS/PET, according to an aspect of the present disclosure.
FIG. 9B is the AFM image of PA@PS/PET at a relative amplitude (Ra) of 17.1 nm, according to an aspect of the present disclosure.
Figures 9C, 9D:
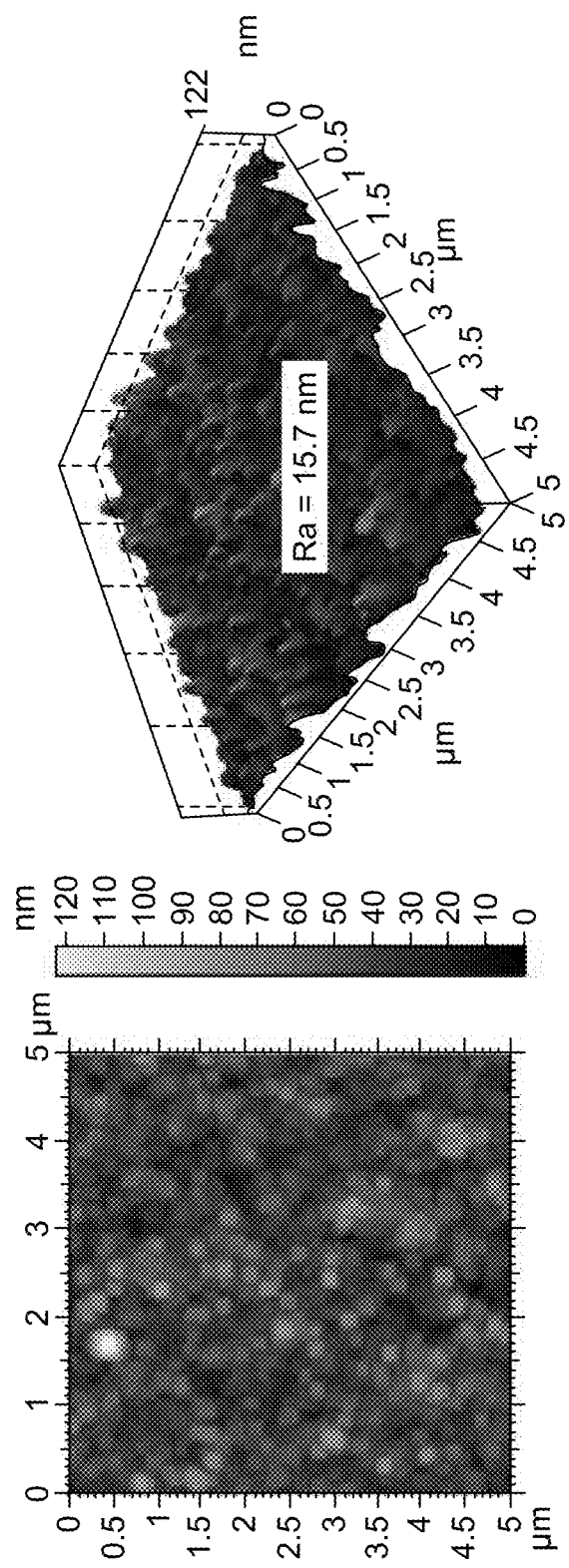
FIG. 9C is an AFM of 0.05%-CuO-MCM-41/PA@PS/PET, according to an aspect of the present disclosure.
FIG. 9D is the AFM image of 0.05%-CuO-MCM-41/PA@PS/PET at a relative amplitude (Ra) of 15.7 nm, according to an aspect of the present disclosure.
Figures 9E, 9F:
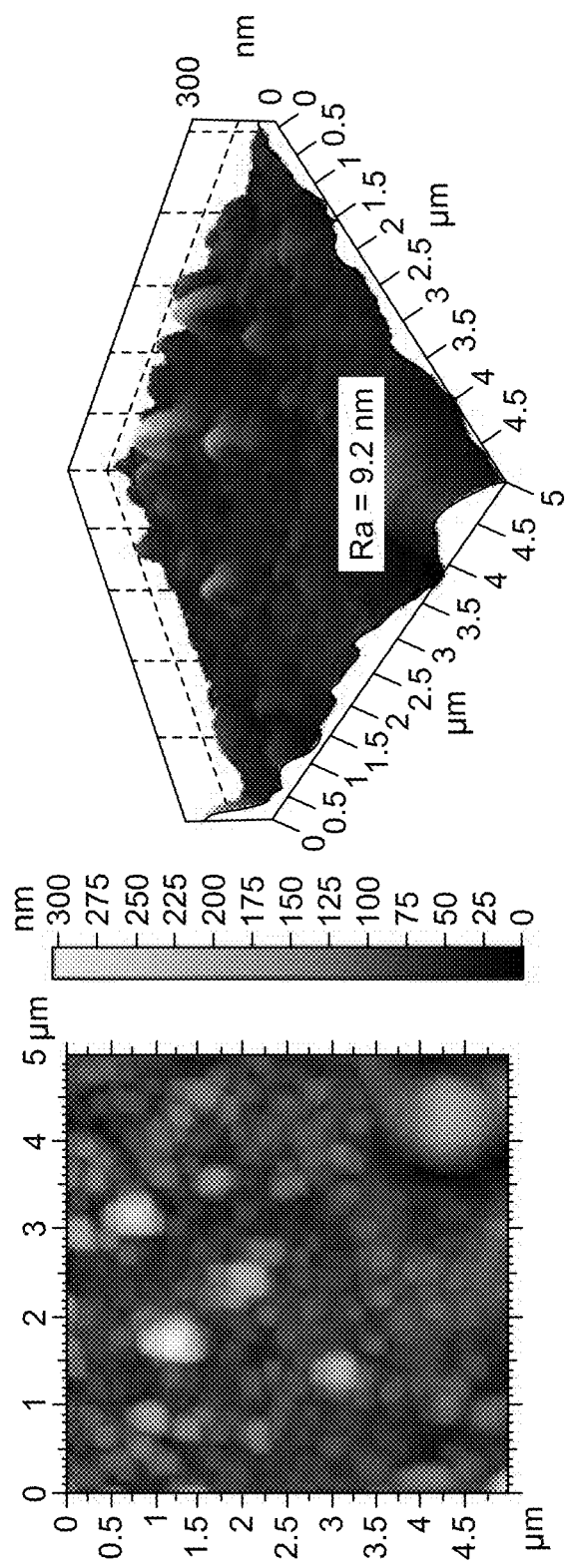
FIG. 9E is an AFM image of 0.10%-CuO-MCM-41/PA@PS/PET, according to an aspect of the present disclosure.
FIG. 9F is the AFM image of 0.10%-CuO-MCM-41/PA@PS/PET at a relative amplitude (Ra) of 9.2 nm, according to an aspect of the present disclosure.

The hydrophilicity of the membrane is used to determine the performance of the membrane during filtration experiments. The surface hydrophilic character of the membranes was determined by measuring the water contact angle (WCA) of the membranes (FIG. 8). The WCA of PA@PS/PET was found to be 83.2° while WCA showed a decrease in case of 0.05%-CuO-MCM-41/PA@PS/PET and 0.10%-CuO-MCM-41/PA@PS/PET with values of 78.2° and 62.5°, respectively. Such decrease in WCA upon adding $NH_2$—CuO-MCM-41 may be attributed to the hydrophilic nature of $NH_2$—CuO-MCM-41, specifically due to the incorporation of CuO and the presence of several hydroxyl groups on the surface of CuO-MCM-41. In addition, the presence of several primary and secondary residual amine groups in the membrane active layer also contributes to the hydrophilicity of the membrane.

Similar to surface hydrophilicity, membrane roughness is also used in determining the performance of the membranes. Surface roughness contributes to the antifouling performance of the membrane, as it has been observed that a rougher surface is highly prone to fouling by organic foulants and bacterial strains. Atomic force microscopy (AFM) was carried out to determine the average surface roughness (Ra) of membranes, as shown in FIG. 9A through FIG. 9F. The value of Ra decreased from 17.1 nm for PA@PS/PET to 15.7 nm and 9.2 nm for 0.05%-CuO-MCM-41/PA@PS/PET and 0.10%-CuO-MCM-41/PA@PS/PET, respectively. Such a decrease in Ra can be attributed to forming a relatively smooth active layer which might be due to extensive crosslinking during IP.

Figure 10A:
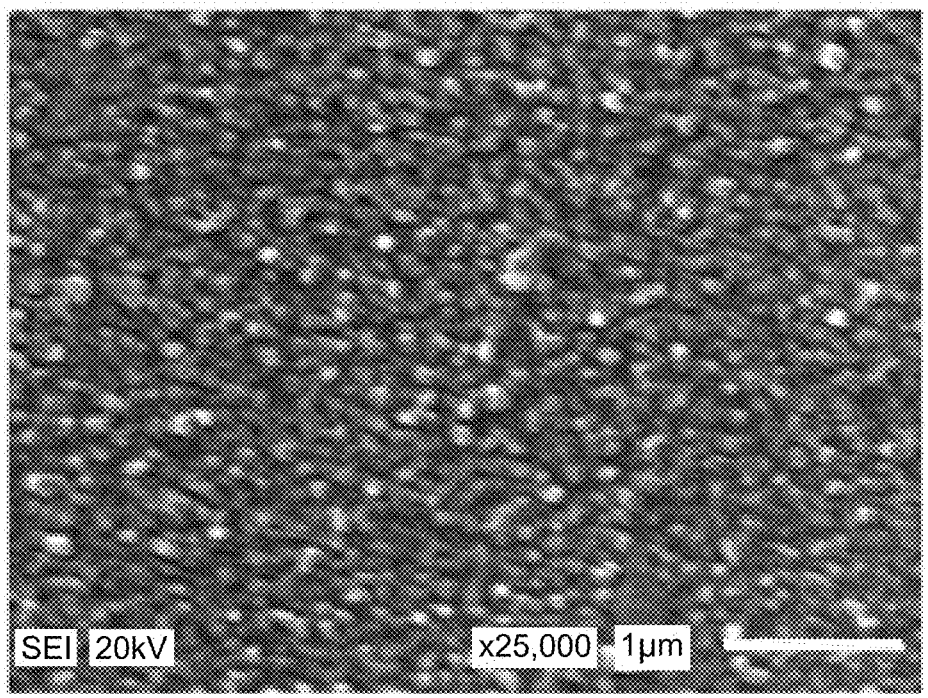
FIG. 10A is an SEM image of PA@PS/PET, according to an aspect of the present disclosure.
Figure 10B:
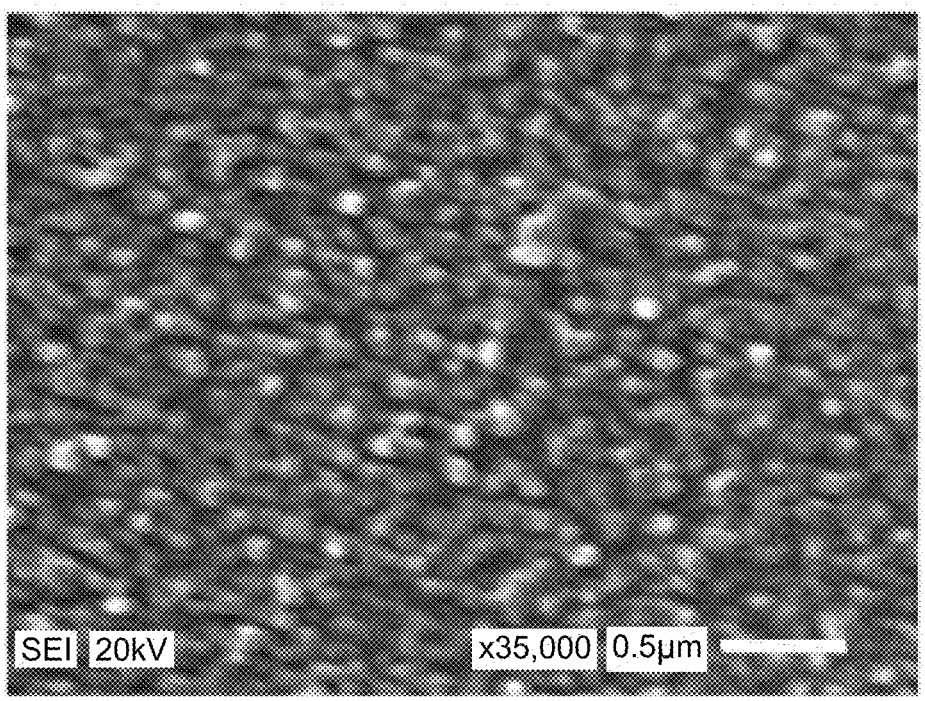
FIG. 10B is an enlarged portion of the SEM image of FIG. 10A, according to an aspect of the present disclosure.
Figure 10C:
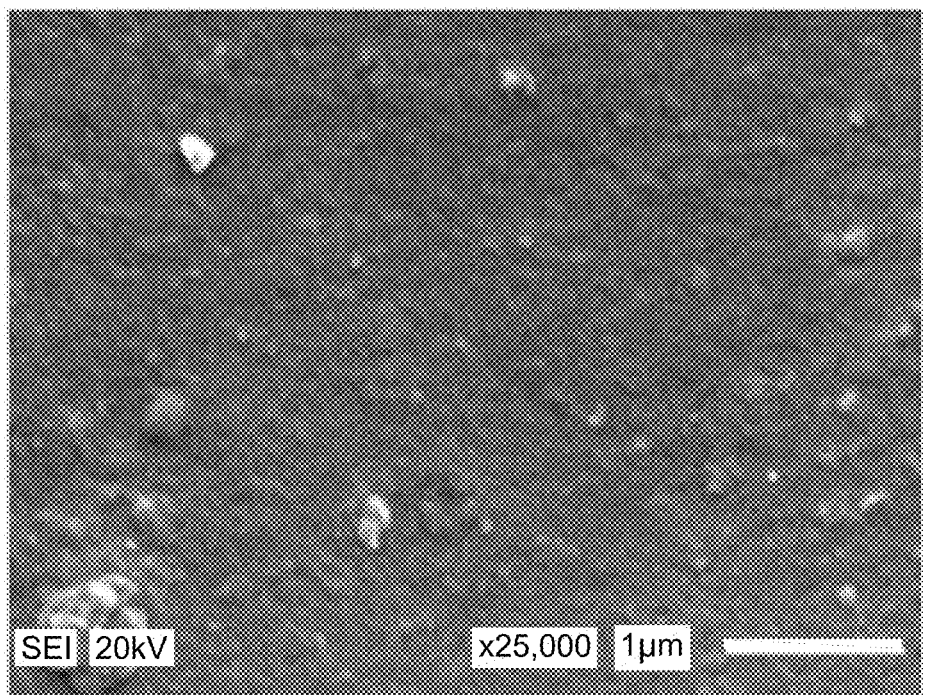
FIG. 10C is an SEM image of 0.05%-CuO-MCM-41/PA@PS/PET, according to an aspect of the present disclosure.
Figure 10D:
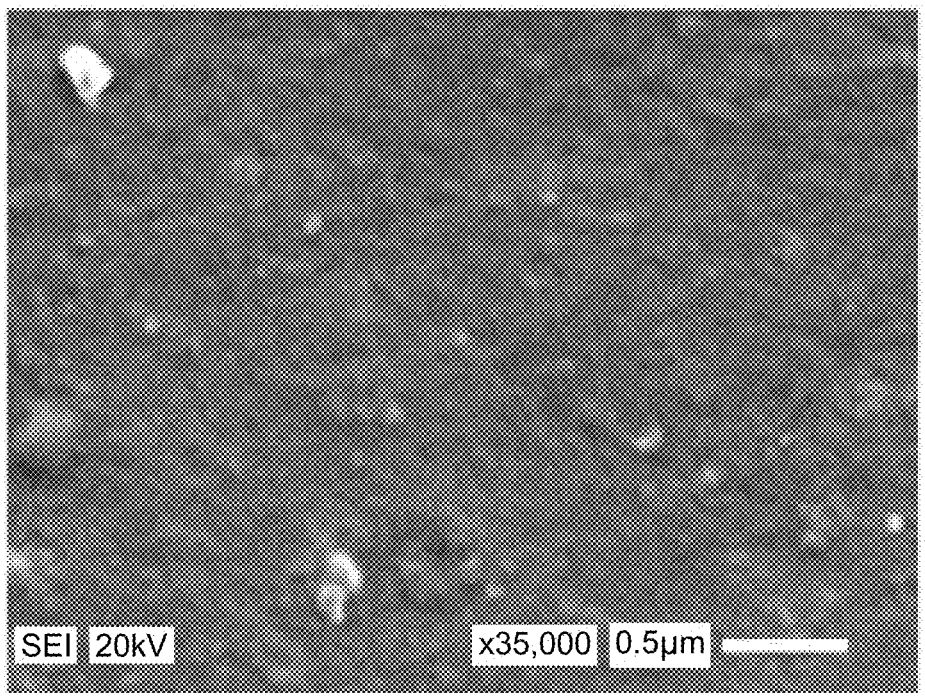
FIG. 10D is an enlarged portion of the SEM image of FIG. 10C, according to an aspect of the present disclosure.
Figure 10E:
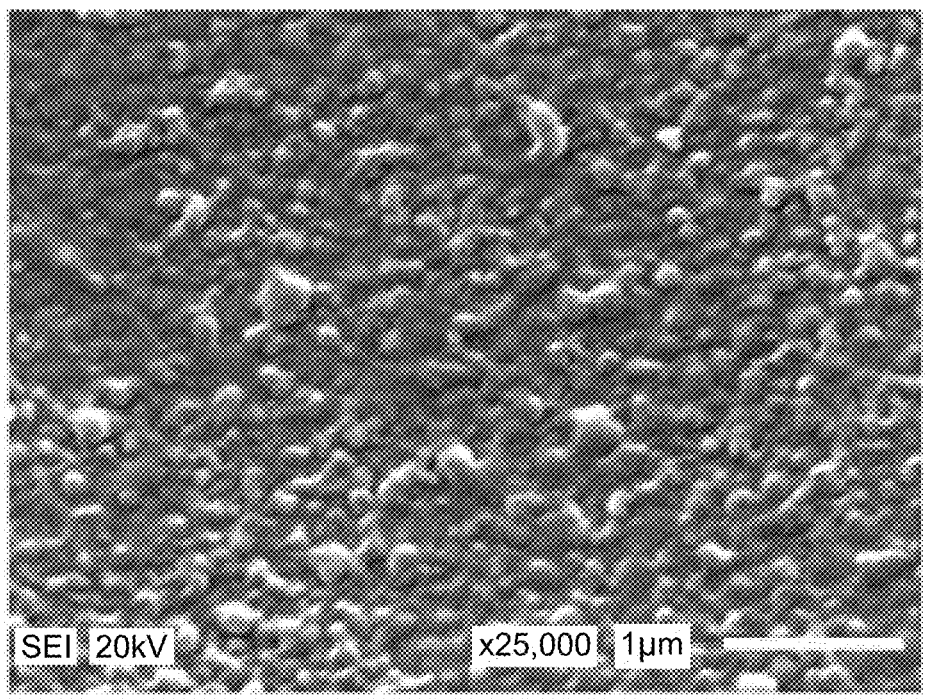
FIG. 10E is an SEM image of 0.10%-CuO-MCM-41/PA@PS/PET, according to an aspect of the present disclosure.
Figure 10F:
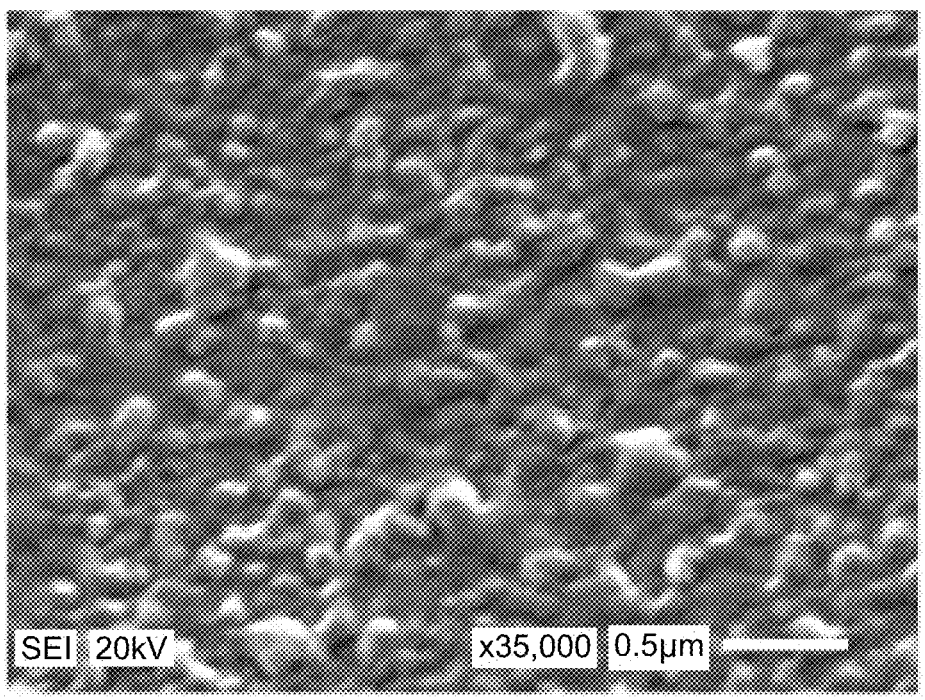
FIG. 10F is an enlarged portion of the SEM image of FIG. 10E, according to an aspect of the present disclosure.

Similar to surface roughness and WCA, the morphological feature of a membrane is the appearance of surface structures and geometries under an electron microscope, which in the case of commercial RO membranes, resembles a ridge and valley structure. The micrographs of PA@PS/PET (FIG. 10A and FIG. 10B) revealed a traditional ridge and valley morphology generally found in commercial membranes. The ridge and valley structure originates from a successful IP reaction between an aqueous amine and n-hexane acid chloride solutions on PS/PET support. However, after the inclusion of 0.05% of —$NH_2$ functionalized CuO-MCM-41 in aqueous amine solution during the IP reaction while keeping the TPC solution the same, the conventional ridge and valley structure is altered for 0.05%-CuO-MCM-41/PA@PS/PET (FIG. 10C and FIG. 10D). The active layer of 0.05%-CuO-MCM-41/PA@PS/PET membrane becomes denser and relatively smoother compared to PA@PS/PET membrane, which has also been confirmed by AFM. This observation suggested that $NH_2$—CuO-MCM-41 contributes to the fabrication of the active layer during the IP reaction. Upon increasing the loading of $NH_2$—CuO-MCM-41 during the IP reaction, the active layer adopts a geometry similar to PA@PS/PET. However, the surface of 0.10%-CuO-MCM-41/PA@PS/PET membrane was smoother than PA@PS/PET, as the ridges and valleys of 0.10%-CuO-MCM-41/PA@PS/PET appear to be filled with inconsistent polymer masses (FIG. 10E and FIG. 10F).

Figure 10G:
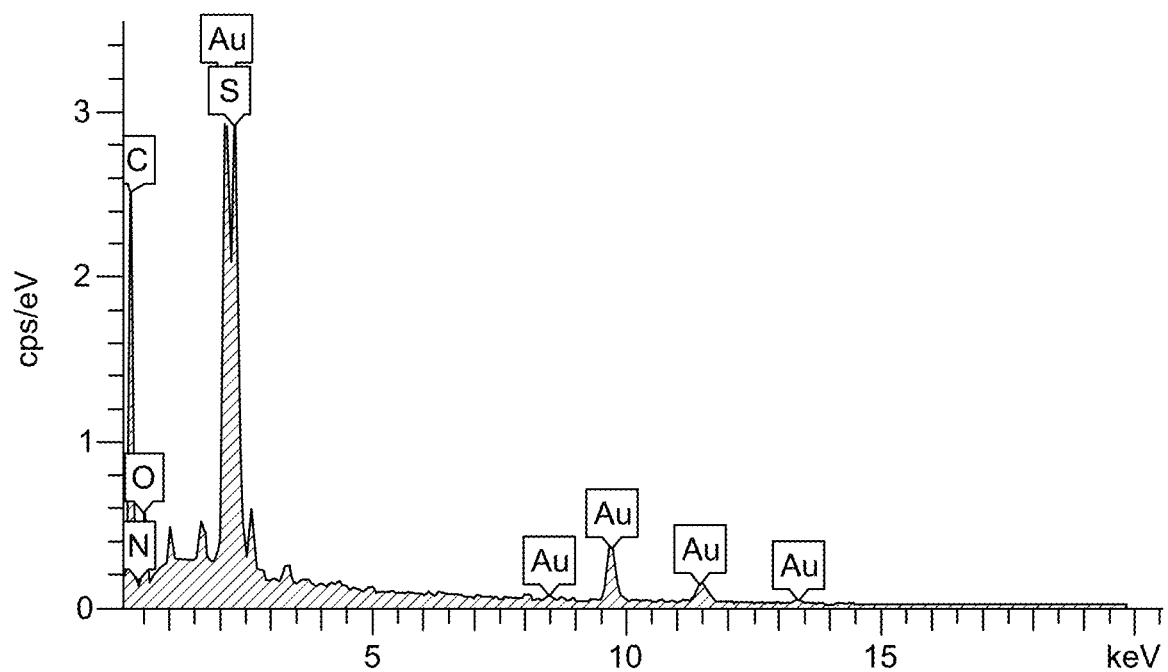
FIG. 10G depicts EDX analysis of PA@PS/PET, according to an aspect of the present disclosure.
Figure 10H:
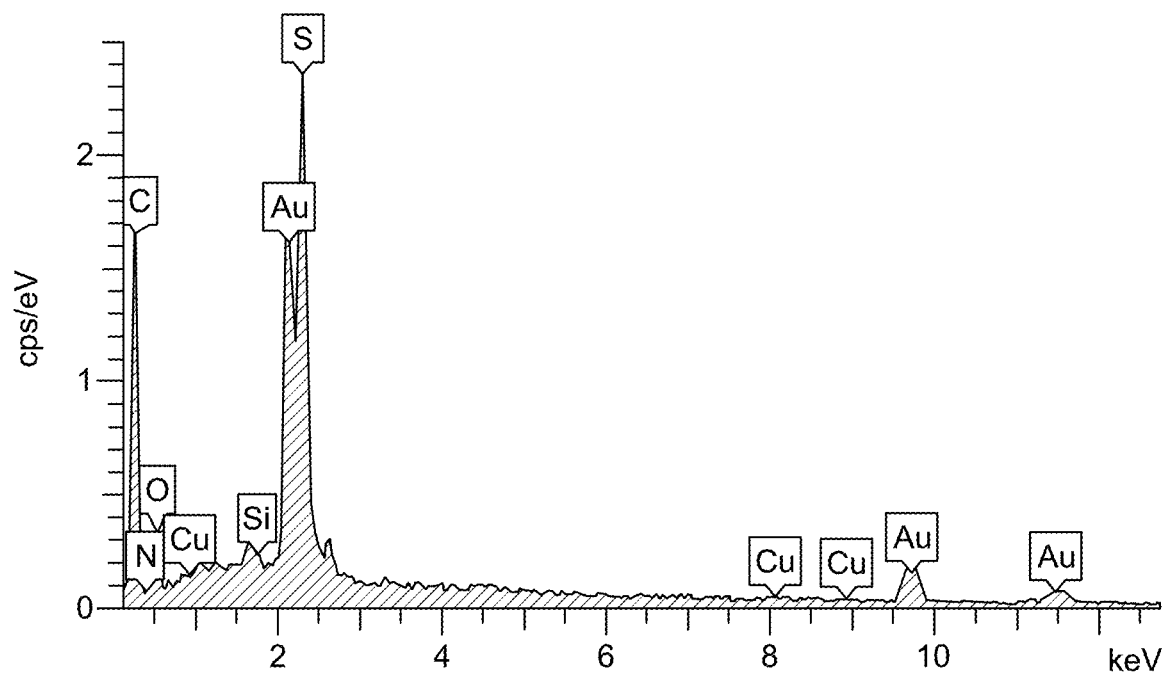
FIG. 10H depicts EDX analysis of 0.05%-CuO-MCM-41/PA@PS/PET, according to an aspect of the present disclosure.
Figure 10I:
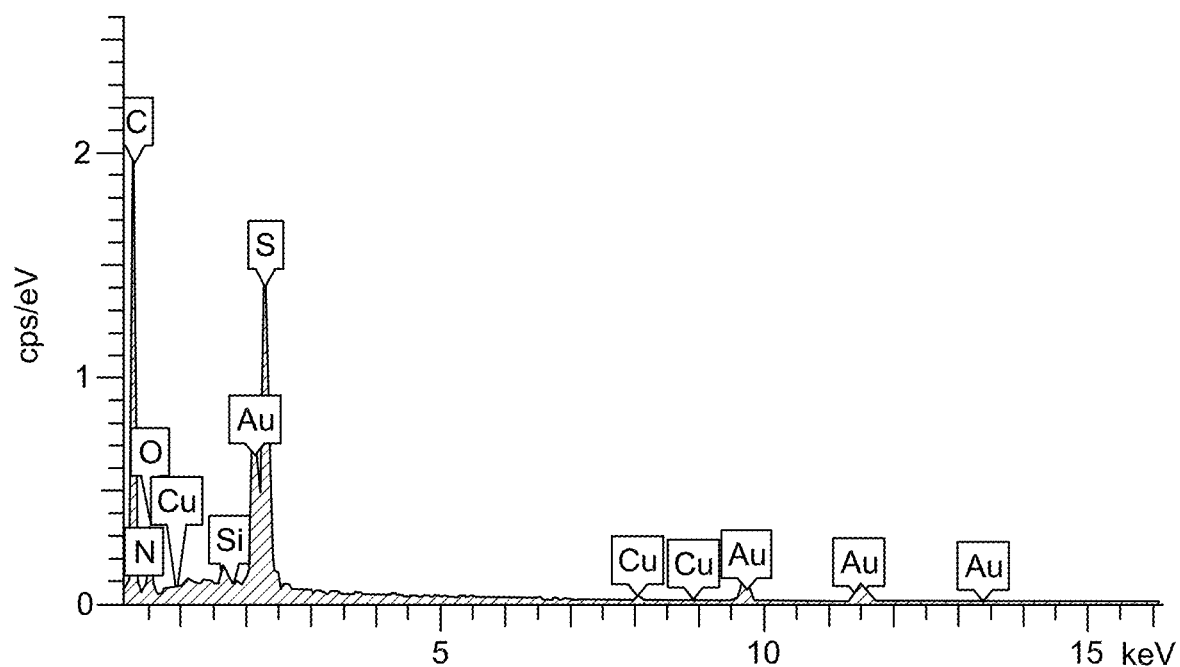
FIG. 10I depicts EDX analysis of 0.10%-CuO-MCM-41/PA@PS/PET, according to an aspect of the present disclosure.
Figure 11A:
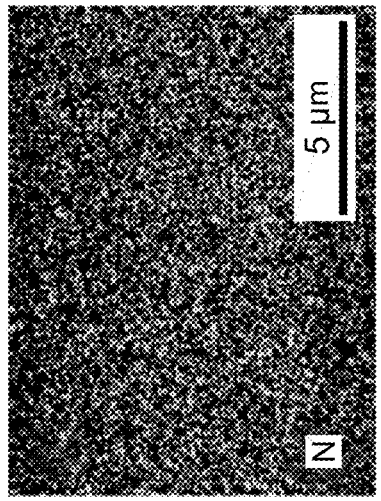
FIG. 11A to FIG. 11E are SEM images depicting elemental mapping of PA@PS/PET, according to aspects of the present disclosure.
Figure 11C:
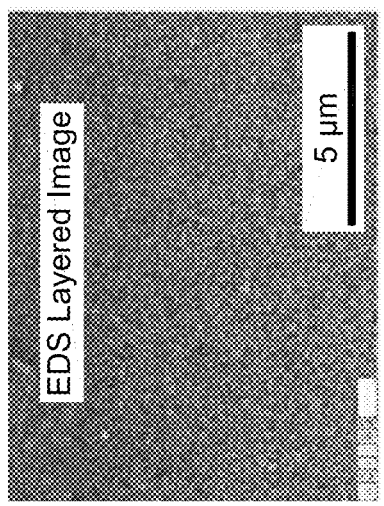
Figure 11B:
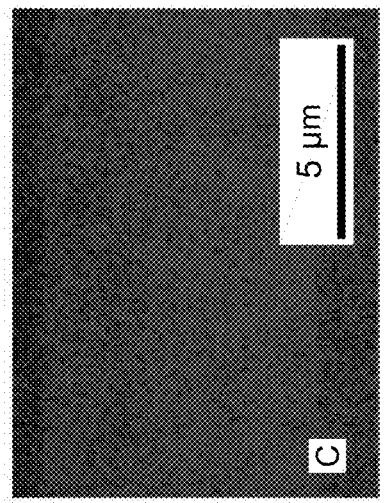
Figure 11E:
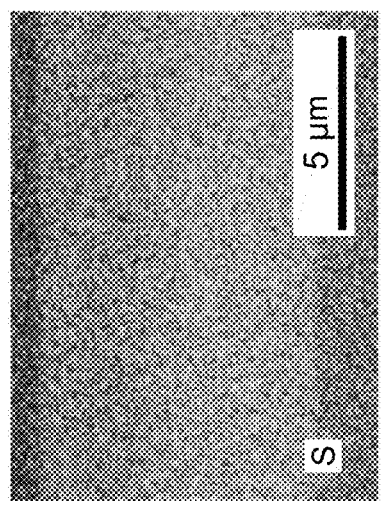
Figure 11D:
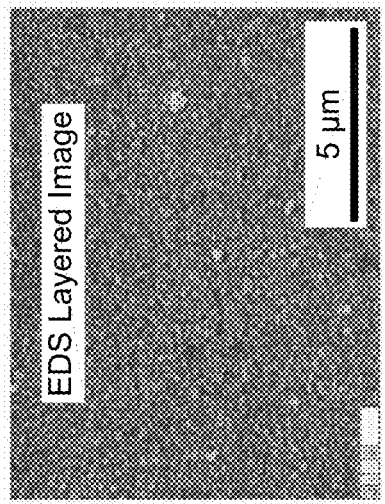
Figure 11F:
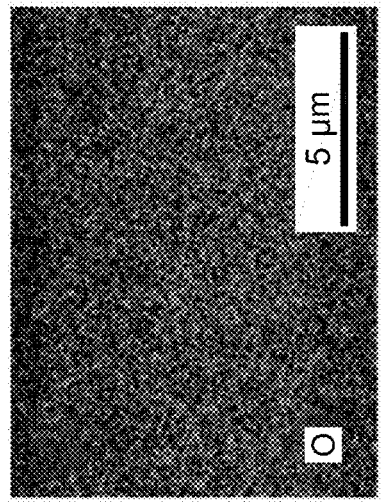
FIG. 11F to FIG. 11L are SEM images depicting elemental mapping of 0.05%-CuO-MCM-41/PA@PS/PET, according to aspects of the present disclosure.
Figure 11I:
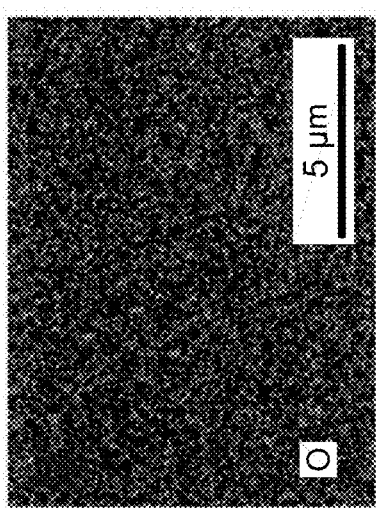
Figure 11L:
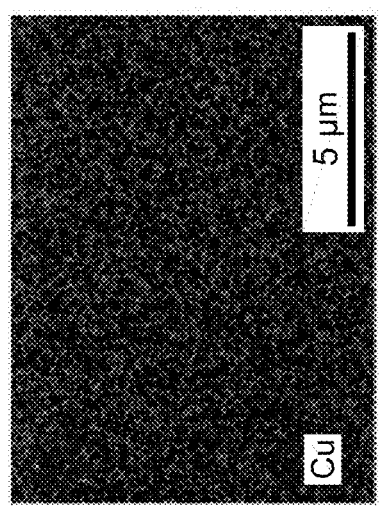
Figure 11H:
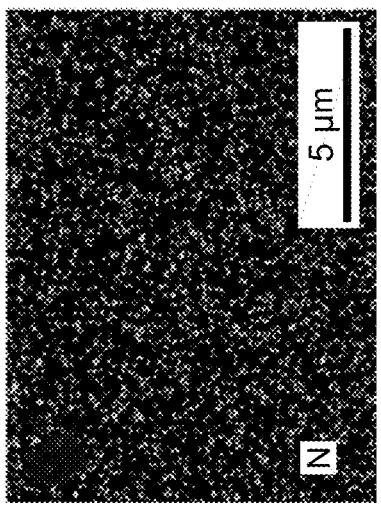
Figure 11K:
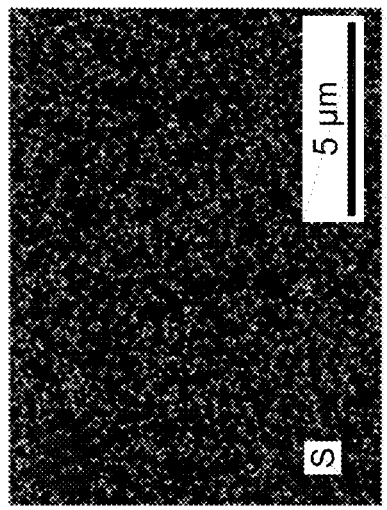
Figure 11G:
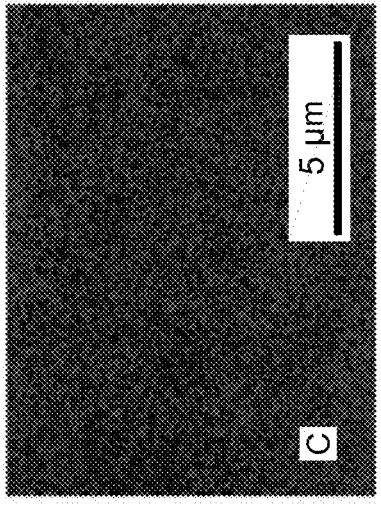
Figure 11J:
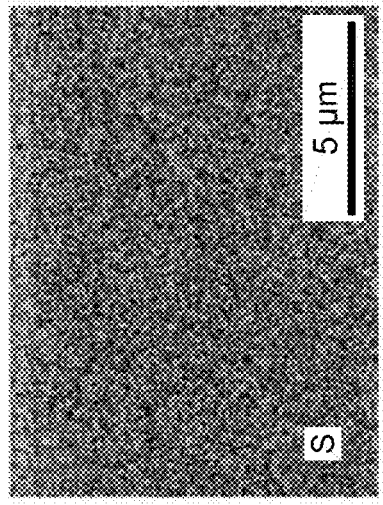

A comparison of SEM micrographs of all the studied membranes revealed that 0.05%-CuO-MCM-41/PA@PS/PET membrane exhibited better surface morphological features for enhanced salt rejection, as shown in the performance analysis of the membranes. Hence, the lower concentration of $NH_2$—CuO-MCM-41 is ideal, while a higher concentration of $NH_2$—CuO-MCM-41 is unsuitable as it might lead to a defective active layer. Similar observations have also been seen in literature with other additives. An SEM analysis of membranes was also performed after filtration experiments which revealed that membranes stayed intact during filtration experiments. The elemental composition of the fabricated membranes was also studied by EDX analysis (FIG. 10G, FIG. 10H, and FIG. 10I). The EDX analysis revealed the presence of all of the constituent elements C, N, O, Cu, S, and Si in 0.05%-CuO-MCM-41/PA@PS/PET (FIG. 10G) and 0.10%-CuO-MCM-41/PA@PS/PET membranes (FIG. 10H). The presence of C, N, and O can be attributed to multiple components taking part in membrane fabrication, such as polyamide and NTS-DETA, while Cu and Si were due to $NH_2$—CuO-MCM-41 and NTSDETA, respectively. These findings support the active contribution of all reacting monomers in membrane fabrication. However, the PA@PS/PET membrane lacked Si and Cu (FIG. 10I).

The uniform distribution of each element over an entire area of membrane detected by the EDX analysis was studied by elemental mapping (See FIG. 11A to FIG. 11L). As a result, all previously detected elements were equally distributed over PA@PS/PET (FIG. 11A to 11E) 0.05%-CuO-MCM-41/PA@PS/PET membrane (FIG. 11I to 11L).

Nanofiltration Performance of the Membranes

Figure 12:
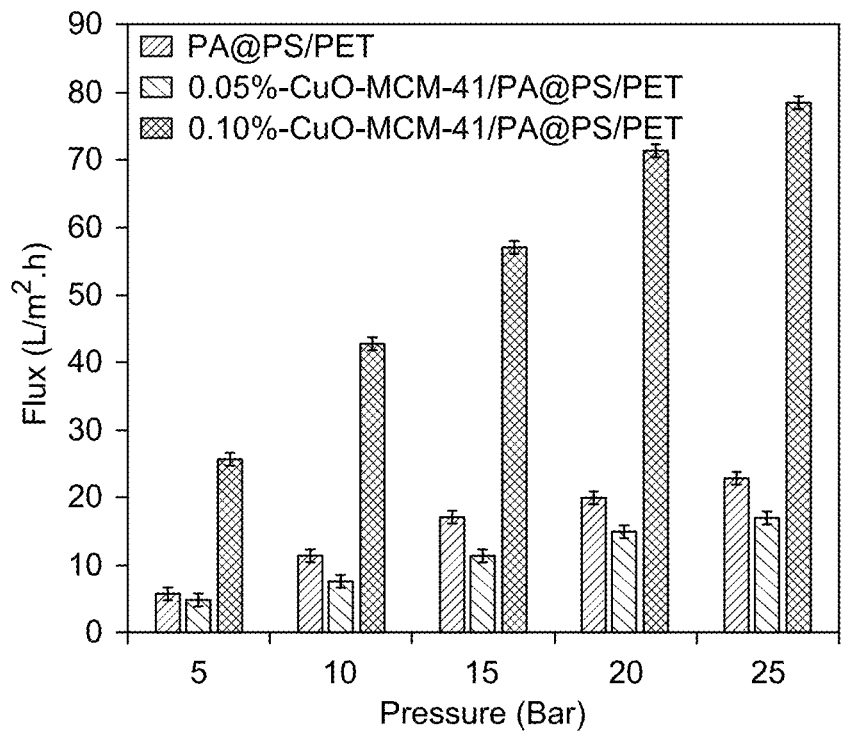
FIG. 12 is a graph illustrating the effect of transmembrane pressure on pure water flux of various membranes, namely, PA@PS/PET, 0.05%-CuO-MCM-41/PA@PS/PET, and 0.10%-CuO-MCM-41/PA@PS/PET, according to an aspect of the present disclosure.

The nanofiltration performance of the membranes was studied by initially using DI water as feed, and transmembrane pressure was varied, as demonstrated in FIG. 12. An obvious relationship was found between applied transmembrane pressure and permeate flux during filtration experiments. The flux was linearly increased with increasing transmembrane pressure, which justified the integrity of the membranes under various feed pressures. The highest pure water permeate flux was 80 LMH (L $m^{-2}$ $h^{-1}$) with 0.10%-CuO-MCM-41/PA@PS/PET, while the pure water permeate flux was 16 LMH for 0.05%-CuO-MCM-41/PA@PS/PET at 25 bar. Although the addition of $NH_2$—CuO-MCM-41 in the active layer of the membrane resulted in lowering WCA of the membranes, the water flux was not dependent only on the WCA. PA@PS/PET had a higher permeate flux of 22 LMH with a higher WCA) (83.2°) compared to 0.05%-CuO-MCM-41/PA@PS/PET with a lower permeate flux of 16 LMH with a lower WCA of 78.2°. The increased concentration of CuO-MCM-41 resulted in forming a densely porous network with certain geometries allowing more permeate to pass through, while in the case of a lower dosage of CuO-MCM-41, the formation of such a network was not noticed. Moreover, the higher concentration of CuO-MCM-41 renders the walls of the pores more hydrophilic, thereby allowing more water to permeate.

Figure 13:
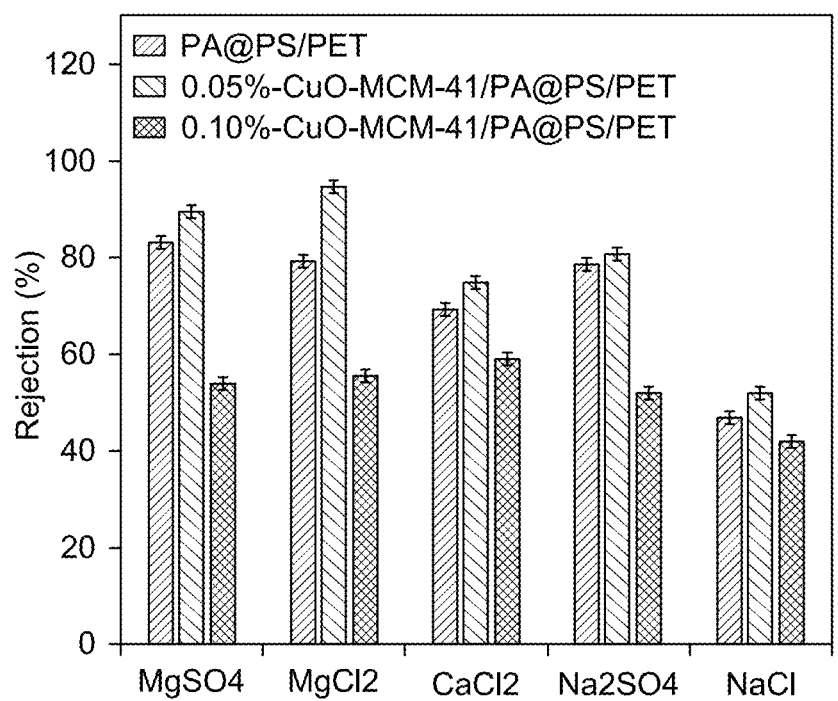
FIG. 13 is a graph illustrating the rejection of salts by various membranes, namely, PA@PS/PET, 0.05%-CuO-MCM-41/PA@PS/PET, and 0.10%-CuO-MCM-41/PA@PS/PET, according to an aspect of the present disclosure.

The rejection profile of the fabricated membranes was studied by using various salt solutions, as shown in FIG. 13. The rejection profile of 0.05%-CuO-MCM-41/PA@PS/PET membrane showed the following decreasing trend $MgCl_2$>$MgSO_4$>$CaCl_2$)>$Na_2SO_4$>NaCl. The highest rejection of $MgCl_2$ was >98% by 0.05%-CuO-MCM-41/PA@PS/PET membrane compared to 78.2% by PA@PS/PET and 58.5% by 0.10%-CuO-MCM-41/PA@PS/PET. As anticipated by the pure water permeate of membranes, the 0.10%-CuO-MCM-41/PA@PS/PET membrane showed the lowest rejection among all studied membranes. Therefore, higher concentrations of $NH_2$—CuO-MCM-41 were unsuitable for membrane fabrication as 0.10%-CuO-MCM-41/PA@PS/PET showed poor performance in rejecting all of the tested salts.

Rejection Performance of the Membranes for Pharmaceuticals

Figure 14:
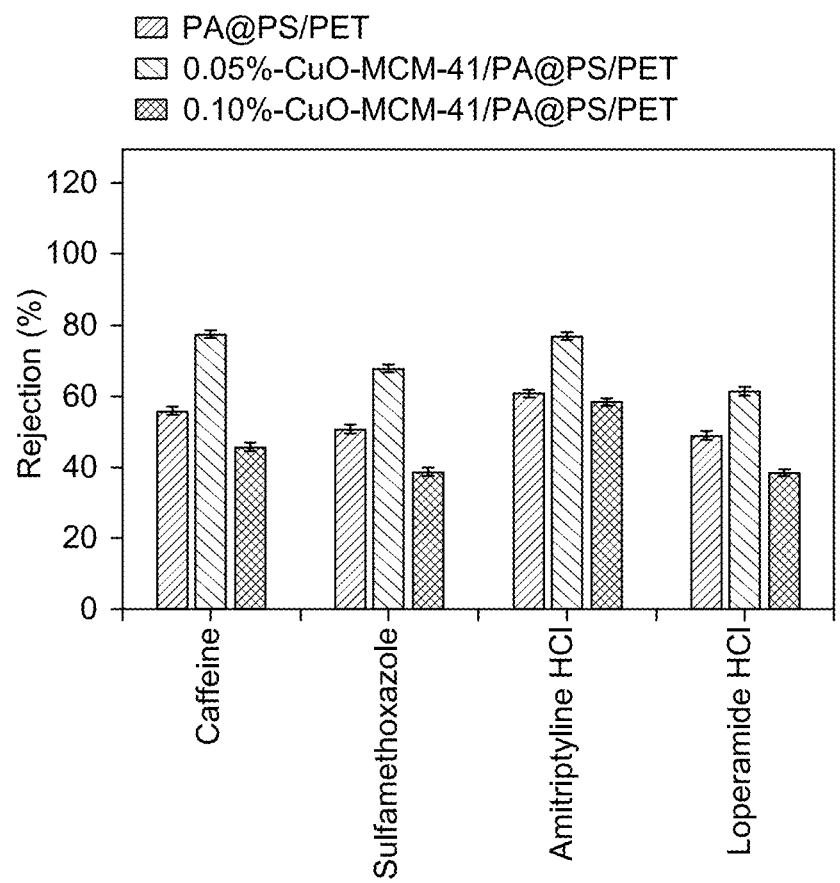
FIG. 14 is a graph illustrating the rejection of drugs by various membranes, namely, PA@PS/PET, 0.05%-CuO-MCM-41/PA@PS/PET, and 0.10%-CuO-MCM-41/PA@PS/PET, according to an aspect of the present disclosure.
Figure 15A:
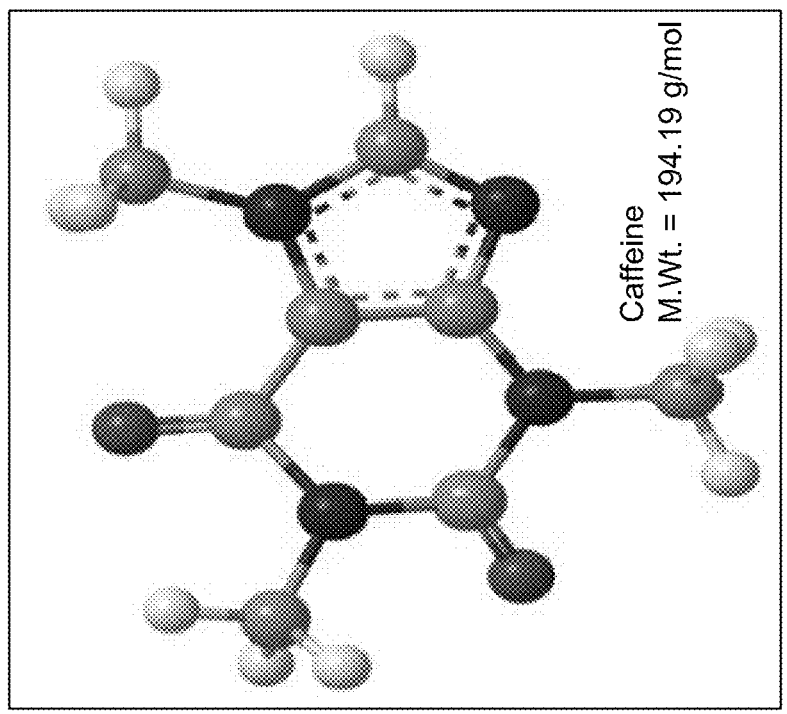
FIG. 15A illustrates absorption spectra of caffeine drug feeds and permeates of various membranes along with corresponding 3D structure, according to an aspect of the present disclosure.
Figure 15A:
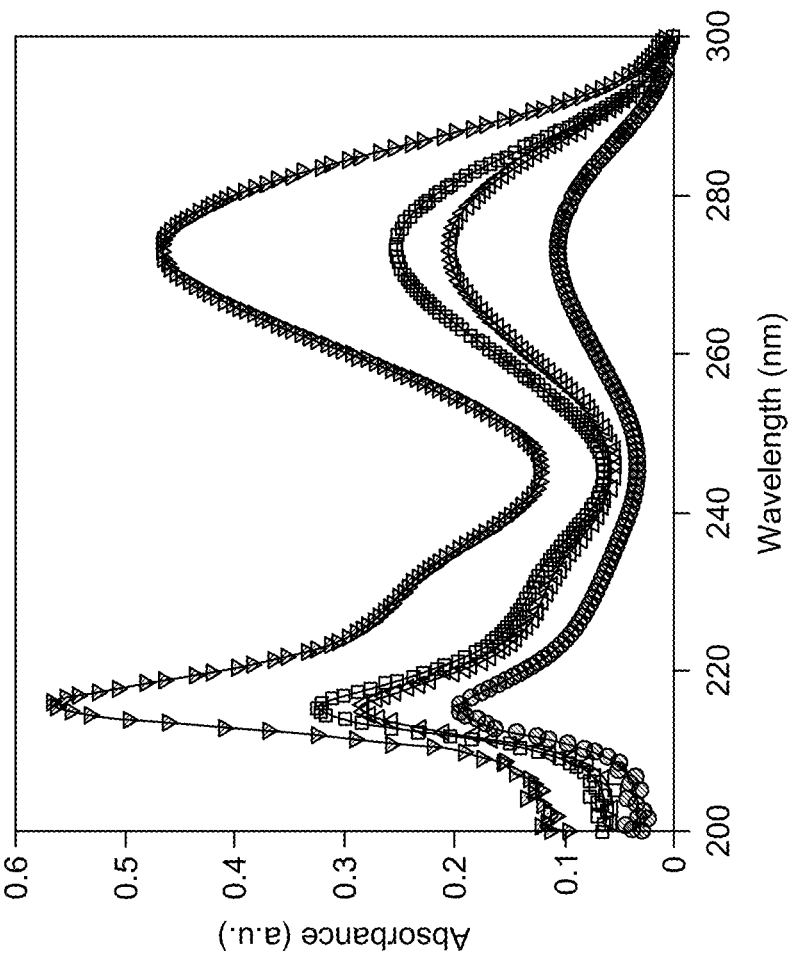
Figure 15B:
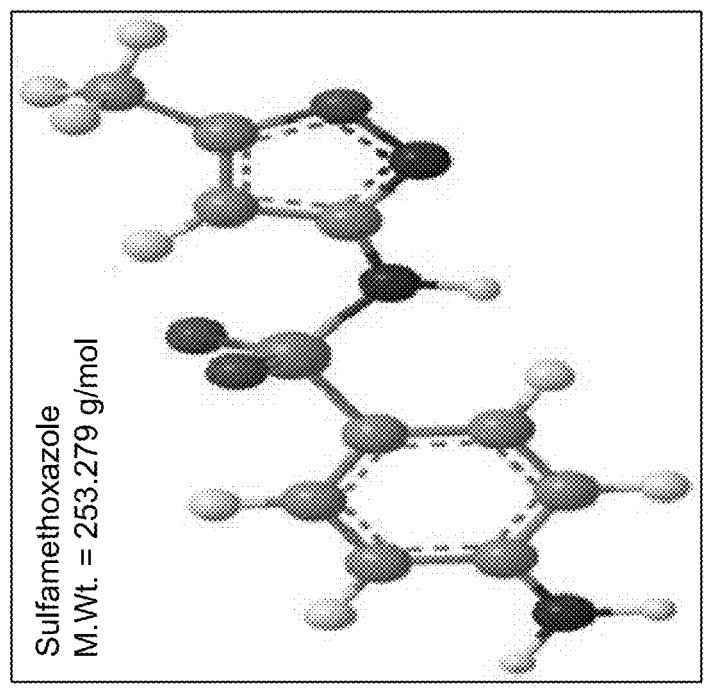
FIG. 15B illustrates absorption spectra of sulfamethoxazole drug feeds and permeates of various membranes along with corresponding 3D structure, according to an aspect of the present disclosure.
Figure 15B:
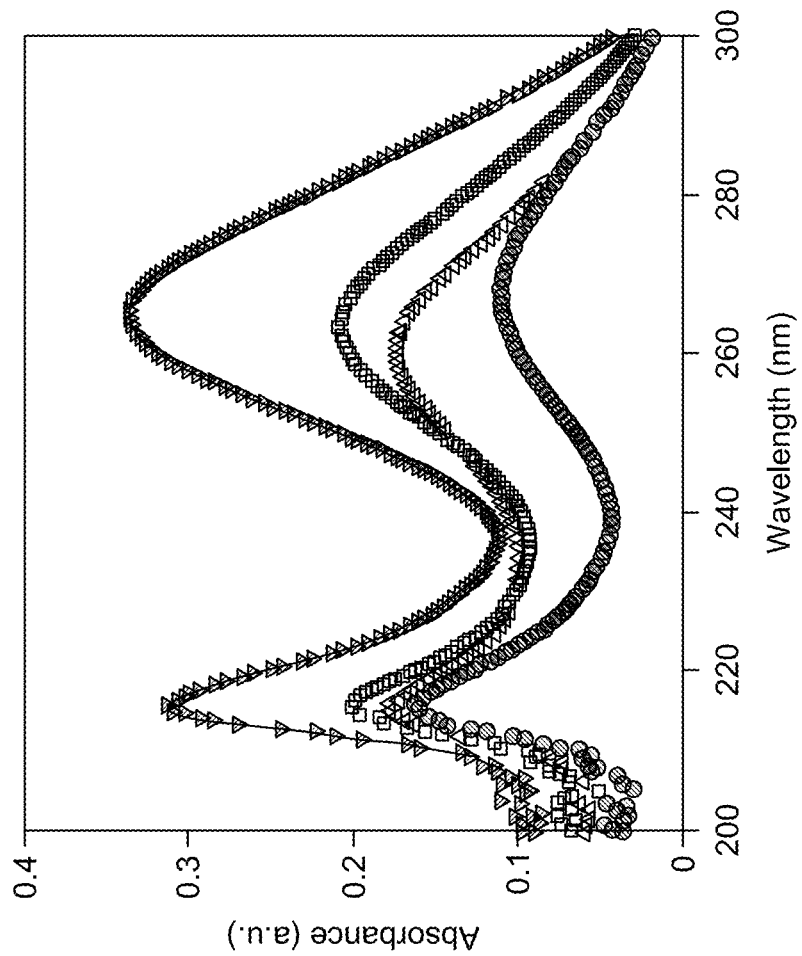
Figure 15C:
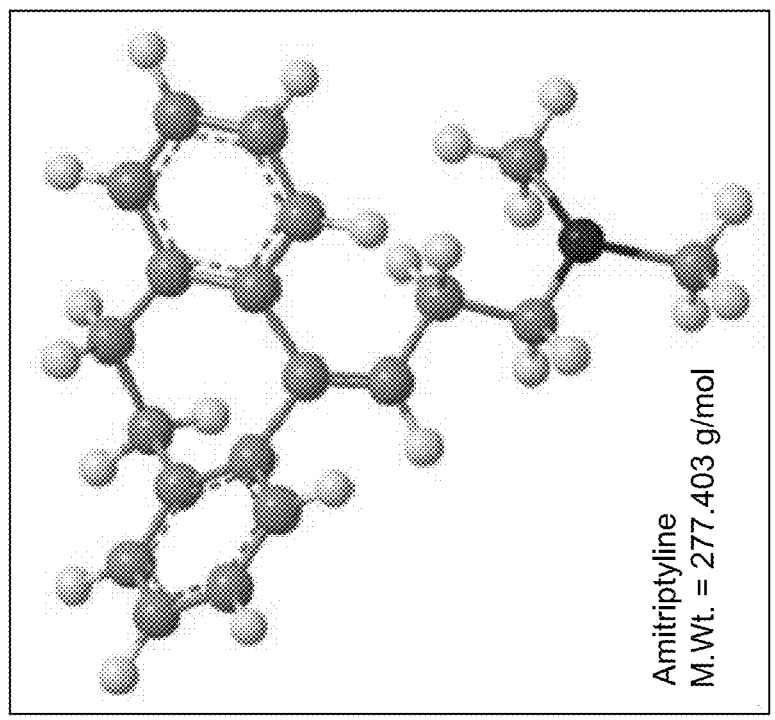
FIG. 15C illustrates absorption spectra of amitriptyline drug feeds and permeates of various membranes along with corresponding 3D structure, according to an aspect of the present disclosure.
Figure 15C:
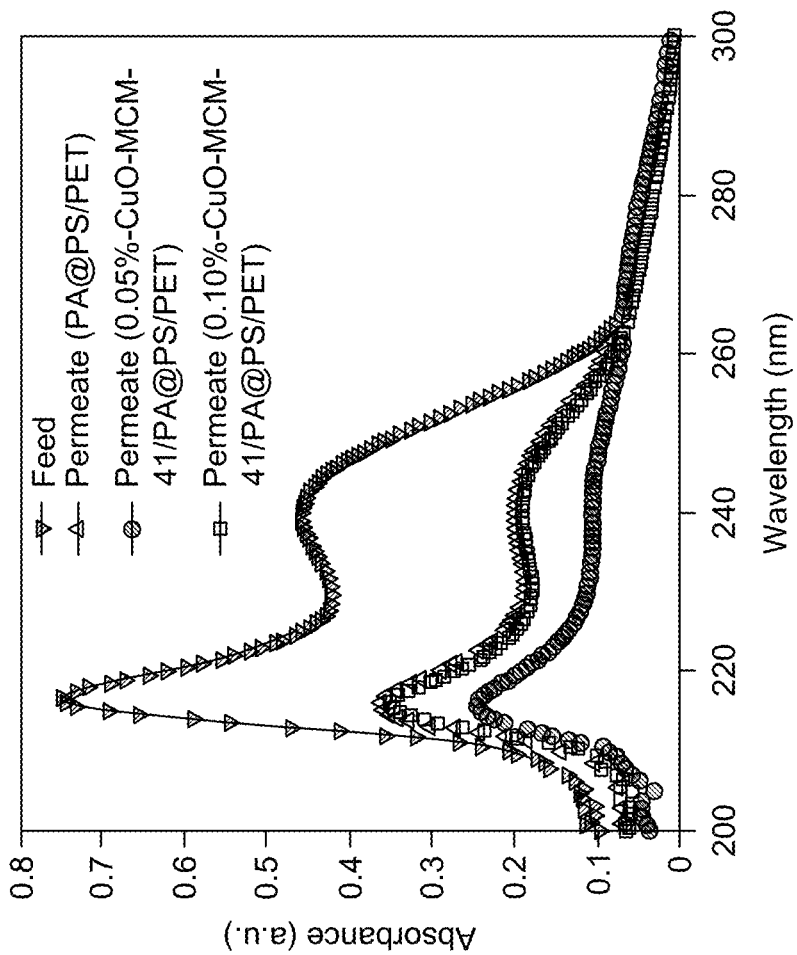
Figure 15D:
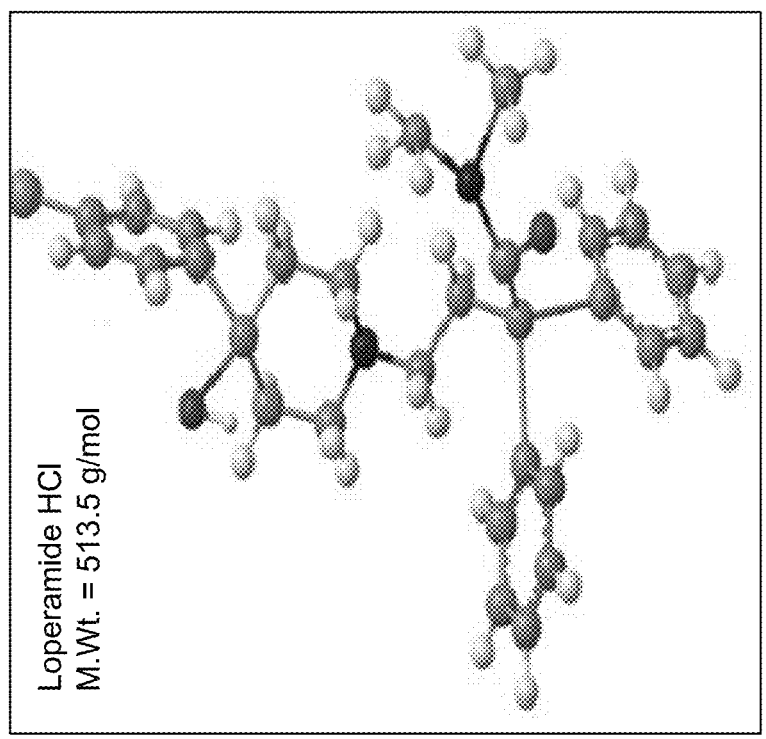
FIG. 15D illustrates absorption spectra of loperamide drug feeds and permeates of various membranes along with corresponding 3D structure, according to an aspect of the present disclosure.
Figure 15D:
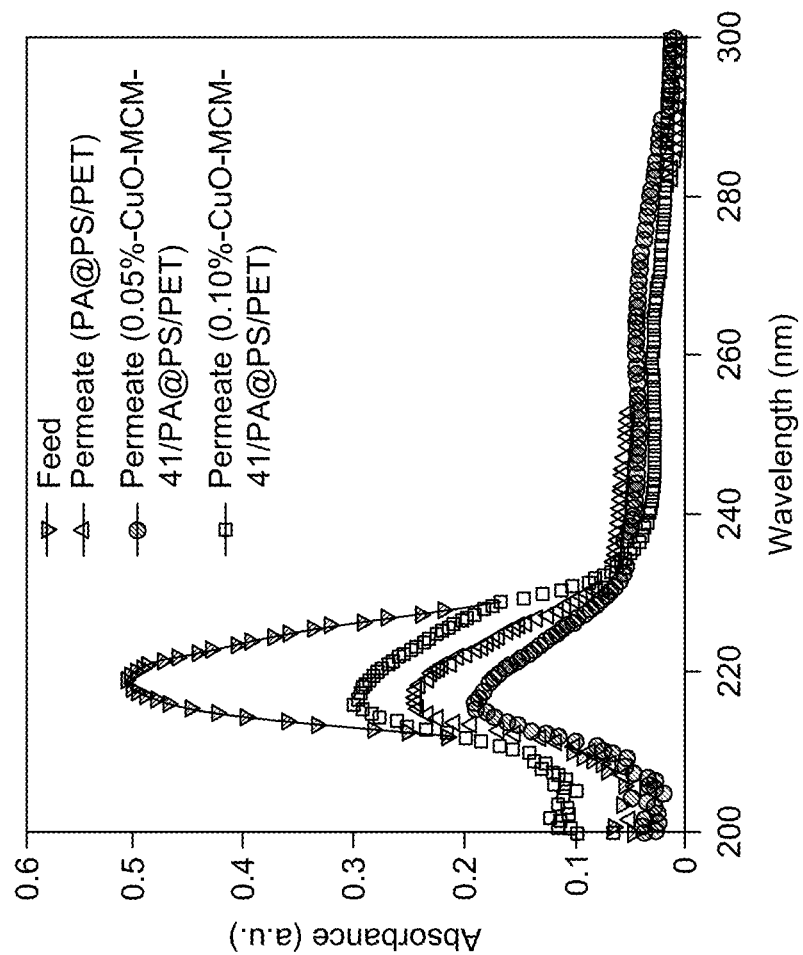

The presence of pharmaceuticals in water is a continuously growing concern as the drugs are released into the water due to human excretion, flushing of drugs through toilets, waste from pharmaceutical plants, and the like. However, most of the wastewater treatments are not focused on separating such pharmaceuticals from wastewater; such drugs can easily pass such treatments. Hence, the separation of drugs from the feed was targeted, as shown in FIG. 14. The rejection of caffeine reached 78% while loperamide was rejected up to 64%, indicating that drugs were not rejected based on size exclusion alone. Instead, the drugs might have been rejected based on Donnan Effect since caffeine possesses multiple functional and heterocyclic rings, which might develop certain interactions with membrane surfaces leading to higher rejection of caffeine. However, amitriptyline was rejected by up to 79%, which might be explained based on size exclusion. Another factor of rejection is the three-dimensional arrangement of molecules of the drugs. The drugs with flexible molecular structures, such as sulfamethoxazole and loperamide, have lower rejection compared to the drugs with rigid molecular structure.

The absorption spectra of feeds and permeates of all of the drugs, along with their three-dimensional (3D) structures, are given in FIG. 15A through FIG. 15D. These spectra of caffeine (FIG. 15A), sulfamethoxazole (FIG. 15B), amitriptyline (FIG. 15C), and loperamide (FIG. 15D) support the observations of rejection of drugs as described above.

To this end, the experiments discussed hereinabove help synthesize Cu-MCM-41, which was functionalized by $N^1$-(3-trimethoxy silylpropyl) diethylenetriamine (NTSDETA) yielding $NH_2$-Cu-MCM-41. The $NH_2$-Cu-MCM-41 was crosslinked with terephthaloyl chloride and tetramine in the active layer of thin film composite (TFC) membrane producing X—CuO-MCM-41/PA@PS/PET membranes. The membranes were tested for their ability to desalinate a feed containing salts such as $MgCl_2$, $MgSO_4$, $CaCl_2$), $Na_2SO_4$, and NaCl with a >98% rejection of $MgCl_2$ by 0.05%-CuO-MCM-41/PA@PS/PET membrane. In addition, the highest permeate flux was achieved to be 16 LMH for 0.05%-CuO-MCM-41/PA@PS/PET at 25 bar. Similarly, the membranes were also applied for rejecting pharmaceutical micropollutants such as caffeine, amitriptyline, sulfamethoxazole, and loperamide, with the rejection of caffeine reaching >78%.

Numerous modifications and variations of the present disclosure are possible in light of the above teachings. It is, therefore, to be understood that, within the scope of the appended claims, the disclosure may be practiced otherwise than as specifically described herein.

The invention claimed is:

1. A filtration membrane, comprising:
   a first layer comprising a triamine-functionalized copper oxide polysilicate mesoporous material, wherein the triamine-functionalized copper oxide polysilicate mesoporous material comprises
      a copper oxide polysilicate backbone and
      a silicon atom of a silicon-containing triamine bonded to a silicate group in the copper oxide polysilicate backbone,
      wherein the copper oxide polysilicate backbone is datively bonded to one or more tetramines,
      wherein the silicon-containing triamine and the one or more tetramines are covalently cross-linked with terephthaloyl chloride to form a polyamide,
   a second layer comprising a polysulfone; and
   a third layer comprising a polyester terephthalate.

2. The filtration membrane of claim 1, wherein the silicon atom of the silicon-containing triamine is covalently bonded to a silicate group of the copper oxide polysilicate backbone.

3. The filtration membrane of claim 1, wherein an amino terminus of the tetramine is coordinated to one or more copper atoms in the copper oxide polysilicate backbone.

4. The filtration membrane of claim 1, wherein the silicon-containing triamine and the one or more tetramines are covalently cross-linked with the terephthaloyl chloride through at least one of a primary amine of the silicon-containing triamine and a secondary amine of the silicon-containing triamine, and at least one of a primary amine of the tetramine and a secondary amine of the tetramine.

5. The filtration membrane of claim 1, wherein the one or more of the tetramines are covalently cross-linked with the terephthaloyl chloride through one or more primary amine of the tetramine and one or more secondary amine of the tetramine.

6. The filtration membrane of claim 1, wherein the silicon-containing triamine is $N^1$-(3-trimethoxysilylpropyl) diethylenetriamine.

7. The filtration membrane of claim 1, wherein the tetramine is N,N'-bis(3-aminopropyl) ethylenediamine.

8. The filtration membrane of claim 1, wherein the membrane comprises the triamine-functionalized copper oxide polysilicate mesoporous material in an amount of 0.01% by weight to 0.2% by weight.

9. The filtration membrane of claim 1, wherein the copper oxide polysilicate mesoporous material has a hierarchical structure of MCM-41.

10. The filtration membrane of claim 1, wherein the silicon-containing triamine and the one or more tetramines are covalently cross-linked with the terephthaloyl chloride with interfacial polymerization.

11. The filtration membrane of claim 1, wherein the polysulfone and polyester terephthalate are prepared by phase inversion.

12. The filtration membrane of claim 1, wherein carbon, nitrogen, oxygen, copper, and silicon are uniformly distributed in the first layer.

13. The filtration membrane of claim 1, wherein the membrane has an average surface roughness from 7 nm to 17 nm.

14. The filtration membrane of claim 1, wherein the membrane has a water contact angle from 80° to 60°.

15. The filtration membrane of claim 1, wherein the membrane has a rate of flux from 15 L m$^{-2}$ h$^{-1}$ to 85 L m$^{-2}$ h$^{-1}$ at a pressure of 25 bar.

16. A nanofiltration method, comprising:
    contacting an aqueous composition with the filtration membrane of claim 1,
    wherein the aqueous composition comprises at least water, one or more salts, and one or more pharmaceuticals,
    collecting a permeate passing through the filtration membrane to obtain a purified composition having a reduced amount of the salts and the pharmaceuticals.

17. The filtration membrane of claim 1, wherein the membrane has a rejection profile of salts from 55% by weight to 99% by weight.

18. The filtration membrane of claim 17, wherein the salts are $MgCl_2$, $MgSO_4$, $CaCl_2$, $Na_2SO_4$, and NaCl.

19. The filtration membrane of claim 1, wherein the membrane has a rejection profile of pharmaceuticals from 60% by weight to 80% by weight.

20. The filtration membrane of claim 19, wherein the pharmaceuticals are caffeine, sulfamethoxazole, amitriptyline, and loperamide.

* * * * *